(12) United States Patent
Bendapudi et al.

(10) Patent No.: US 11,949,877 B2
(45) Date of Patent: Apr. 2, 2024

(54) ADAPTIVE ENCODING OF SCREEN CONTENT BASED ON MOTION TYPE

(71) Applicant: Microsoft Technology Licensing, LLC, Redmond, WA (US)

(72) Inventors: Satya Sasikanth Bendapudi, Bellevue, WA (US); Ming-Chieh Lee, Bellevue, WA (US); Yan Lu, Beijing (CN); Bin Li, Beijing (CN); Jizhe Jin, Kirkland, WA (US); Jiahao Li, Beijing (CN); Shao-Ting Wang, Irvine, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/492,511

(22) Filed: Oct. 1, 2021

(65) Prior Publication Data

US 2023/0108645 A1 Apr. 6, 2023

(51) Int. Cl.
*H04N 19/139* (2014.01)
*G06T 1/20* (2006.01)
*G06V 20/40* (2022.01)
*H04N 19/132* (2014.01)
*H04N 19/172* (2014.01)
*H04N 19/196* (2014.01)

(52) U.S. Cl.
CPC ............. *H04N 19/139* (2014.11); *G06T 1/20* (2013.01); *G06V 20/41* (2022.01); *H04N 19/132* (2014.11); *H04N 19/172* (2014.11); *H04N 19/196* (2014.11)

(58) Field of Classification Search
CPC .. H04N 19/139; H04N 19/132; H04N 19/172; H04N 19/196; G06V 20/41; G06T 1/20
See application file for complete search history.

(56) References Cited

U.S. PATENT DOCUMENTS

| | | | |
|---|---|---|---|
| 2006/0174303 A1* | 8/2006 | Yoshimoto | H04N 19/127 375/E7.181 |
| 2011/0007798 A1* | 1/2011 | Pun | H04N 19/196 375/240.03 |
| 2013/0022124 A1* | 1/2013 | Sekiguchi | H04N 19/61 375/E7.243 |
| 2017/0085892 A1* | 3/2017 | Liu | H04N 19/53 |
| 2021/0274217 A1* | 9/2021 | Lim | H04N 19/52 |
| 2021/0306638 A1* | 9/2021 | Kang | H04N 19/105 |

* cited by examiner

*Primary Examiner* — Neil R Mikeska
(74) *Attorney, Agent, or Firm* — Klarquist Sparkman, LLP

(57) ABSTRACT

Innovations in adaptive encoding of screen content based on motion type are described. For example, a video encoder system receives a current picture of a video sequence. The video encoder system determines a current motion type for the video sequence and, based at least in part on the current motion type, sets one or more encoding parameters. Then, the video encoder system encodes the current picture according to the encoding parameter(s). The innovations can be used in real-time encoding scenarios when encoding screen content for a screen sharing application, desktop conferencing application, or other application. In some cases, the innovations allow a video encoder system to adapt compression to different characteristics of screen content at different times within the same video sequence.

16 Claims, 10 Drawing Sheets software 180 implementing one or more innovations for adaptive encoding of video content based on motion type software 180 implementing one or more innovations for adaptive encoding of video content based on motion type

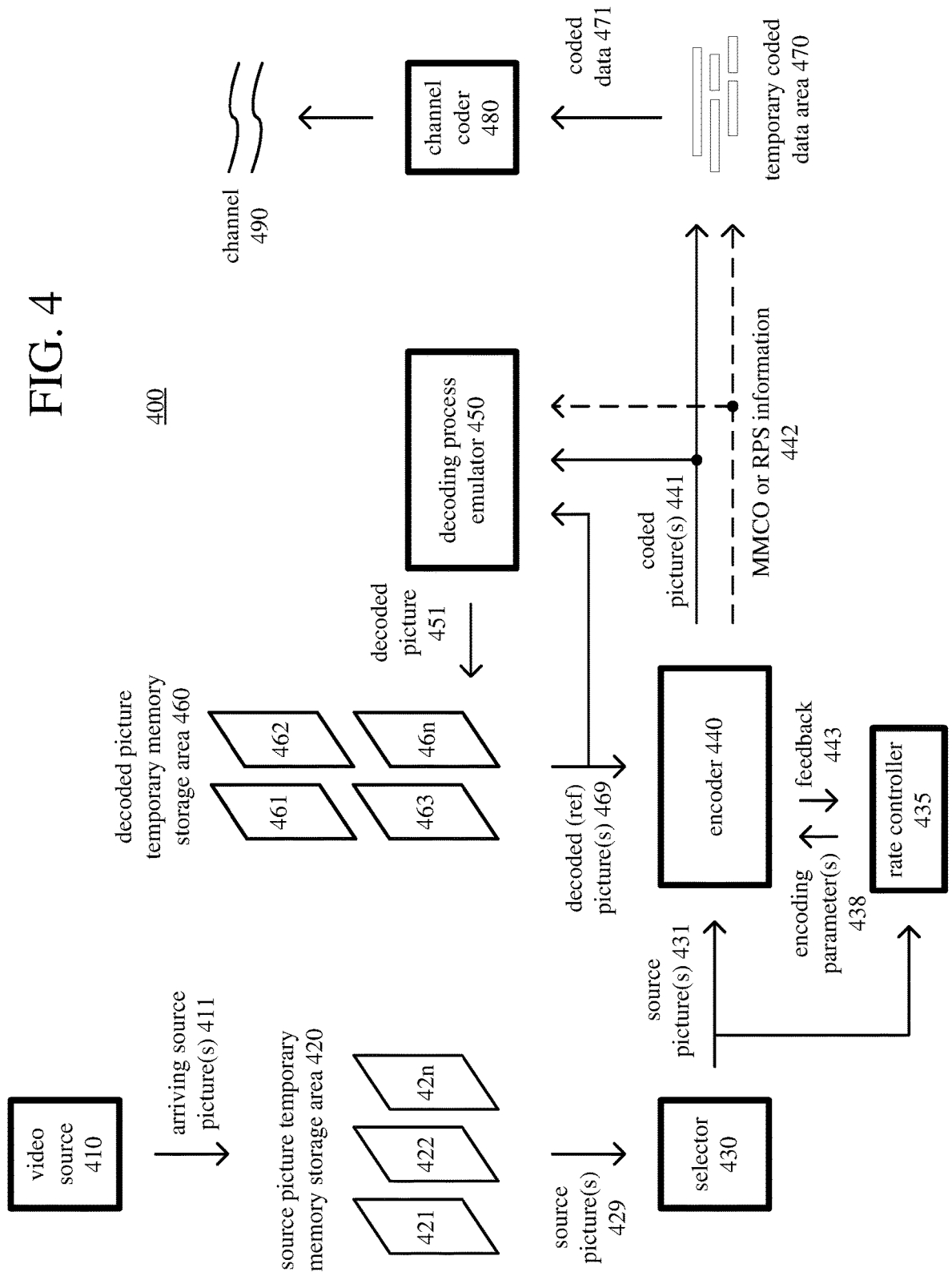

500 in GPU:

in CPU:

ADAPTIVE ENCODING OF SCREEN CONTENT BASED ON MOTION TYPE

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last three decades, various video codec standards have been adopted, including the ITU-T H.261, H.262, H.263, H.264, and H.265 standards, the MPEG-1 and MPEG-4 Visual standards, the SMPTE 421M (VC-1) standard, and the AV1 standard. More recently, the ITU-T H.266 standard has been under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

When compressing video content, a video encoder converts the video content into a lower bit rate form. Compression can be computationally intensive. To reduce the bit rate of the encoded video content and/or reduce the computational complexity of compression, a video encoder can lower the resolution of the video content in various ways. For example, a video encoder can compress video content at a lower frame rate, so that the video content is represented using fewer frames per second (e.g., 10 frames per second instead of 30 frames per second). Lowering the frame rate of video content tends to reduce bit rate and lower computational complexity, but motion in the reconstructed video content may appear choppy. As another example, a video encoder can compress video content at a lower spatial resolution, with a given frame of the video content being represented using fewer pixel values (e.g., 800×600 pixel values per frame instead of 1600×1200 pixel values per frame). Lowering the spatial resolution of video content tends to reduce bit rate and lower computational complexity, but the reconstructed video content may lack fine details such as textures. As another example, a video encoder can represent different types of data more "coarsely" (with fewer possible values) to reduce bit rate (e.g., using 16 possible values instead of 256 possible values). Representing data more coarsely tends to reduce bit rate, but the reconstructed video content may be blurry, have perceptible boundaries between blocks, have blotches of colors instead of smooth gradations, and/or otherwise show perceptible flaws introduced by compression.

Some video encoders are adapted for compression of "artificially" created video content such as screen content (also called screen capture content). Common scenarios for compression of screen content include remote desktop conferencing and screen sharing. In some prior encoder systems adapted for compression of screen content, a user can manually configure a video encoder to favor smooth playback or crisp playback, in the event that the encoder system needs to reduce temporal resolution (frame rate) or spatial resolution in order to reach a target bit rate level, or in the event that the encoder system needs to lower the computational complexity of compression. To favor crisp playback, screen content is compressed at a lower frame rate but higher spatial resolution, which may be suitable for screen content depicting text or graphics that are static, but which can result in choppy motion. On the other hand, to favor smooth playback, screen content is compressed at a higher frame rate but lower spatial resolution, which may be suitable for screen content with significant motion, but which can result in noticeable loss of details. These prior approaches to favoring smooth playback or crisp playback are inflexible and, in many situations, fail to provide high-quality playback.

SUMMARY

In summary, the detailed description presents innovations in adaptive encoding of screen content based on motion type. For example, a video encoder system receives a current picture of a video sequence. The video encoder system determines a current motion type for the video sequence and, based at least in part on the current motion type, sets one or more encoding parameters. Then, the video encoder system encodes the current picture according to the encoding parameter(s). The innovations can be used in real-time encoding scenarios when encoding screen content for a screen sharing application, desktop conferencing application, or other application. In some cases, the innovations allow a video encoder system to adapt compression to different characteristics of screen content at different times within the same video sequence. In some example implementations, for example, when a video encoder system needs to reduce temporal resolution (frame rate) or spatial resolution in order to reach a target bit rate level or lower the computational complexity of compression, the video encoder system can dynamically decide whether to reduce temporal resolution or reduce spatial resolution, depending on the screen content being compressed.

According to one aspect of the innovations described herein, in determining the current motion type, the video encoder system calculates a first measure of motion in a first temporal window and calculates a second measure of motion in a second temporal window, which is longer than the first temporal window. For example, the first measure of motion is based on differences between a current picture and previous picture, and the second measure is based on classifications of pictures over the last x seconds (e.g., 3 seconds). The previous picture is, e.g., the last stored picture. The respective measures of motion can be compared to threshold values that depend on the latest value of the current motion type, so as to stabilize the current motion type across encoding of different pictures of the video sequence. With the second temporal window, in many cases, the video encoder system can effectively adapt compression depending on the motion characteristics of screen content, without waiting too long to switch encoding parameters, and without wasting system resources by switching encoding parameters too often.

According to another aspect of the innovations described herein, in setting the encoding parameter(s), the video encoder system selectively switches between multiple encoder layouts depending on the current motion type for the video sequence. The multiple encoder layouts include a first layout and a second layout. The first layout has a first frame rate and a first spatial resolution among the encoding parameter(s). The second layout has a second frame rate and a second spatial resolution among the encoding parameter(s). The encoder layouts capture different tradeoffs for temporal resolution and spatial resolution. For example, the second frame rate is lower than the first frame rate, but the second spatial resolution is higher than the first spatial resolution. In this way, the video encoder system can quickly and efficiently switch between different sets of encoding parameters (reflecting different tradeoffs between temporal resolution and spatial resolution) depending on the current motion type.

According to another aspect of the innovations described herein, in determining the current motion type, the video encoder system uses a graphics processing unit ("GPU") to perform certain operations. With the GPU, the video encoder system uses first shader code to map texture values for the current picture to pixel values of the current picture. With the GPU, the video encoder system uses second shader code to calculate differences between the pixel values of the current picture and corresponding pixel values (that is, the pixel values at the same locations) of a previous picture of the video sequence. In this way, the video encoder system can offload certain operations from a central processing unit ("CPU") to the GPU, and thereby speed up overall processing. The video encoder system can also, with the GPU and as part of approximation with a MIP map chain, downsample a difference picture (which includes the differences) from a first spatial resolution to a second, lower spatial resolution, before transferring the differences from memory accessible to the GPU to shared memory. In this way, the video encoder system can reduce the volume of data transferred from the GPU to the shared memory.

The innovations for adaptive encoding of screen content based on motion type can be implemented as part of a method, as part of a computer system configured to perform the method, or as part of a tangible computer-readable media storing computer-executable instructions for causing one or more processors, when programmed thereby, to perform the method. The various innovations can be used in combination or separately. The innovations described herein include, but are not limited to, the innovations covered by the claims. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures and illustrates a number of examples. Examples may also be capable of other and different applications, and some details may be modified in various respects all without departing from the spirit and scope of the disclosed innovations.

BRIEF DESCRIPTION OF THE DRAWINGS

The following drawings illustrate some features of the disclosed innovations.

FIG. 4 is a diagram illustrating an example video encoder system in conjunction with which some described embodiments can be implemented.

DETAILED DESCRIPTION

The detailed description presents innovations in adaptive encoding of screen content based on motion type. In particular, the innovations can be used in real-time encoding scenarios when encoding screen content for a screen sharing application, desktop conferencing application, or other application. In some cases, the innovations allow a video encoder system to adapt compression to different characteristics of screen content at different times within the same video sequence.

In the examples described herein, identical reference numbers in different figures indicate an identical component, module, or operation. More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Some of the innovations described herein address one or more of the problems noted in the background. Typically, a given technique/tool does not solve all such problems. It is to be understood that other examples may be utilized and that structural, logical, software, hardware, and electrical changes may be made without departing from the scope of the disclosure. The following description is, therefore, not to be taken in a limited sense.

I. Example Computer Systems

Figure 1:
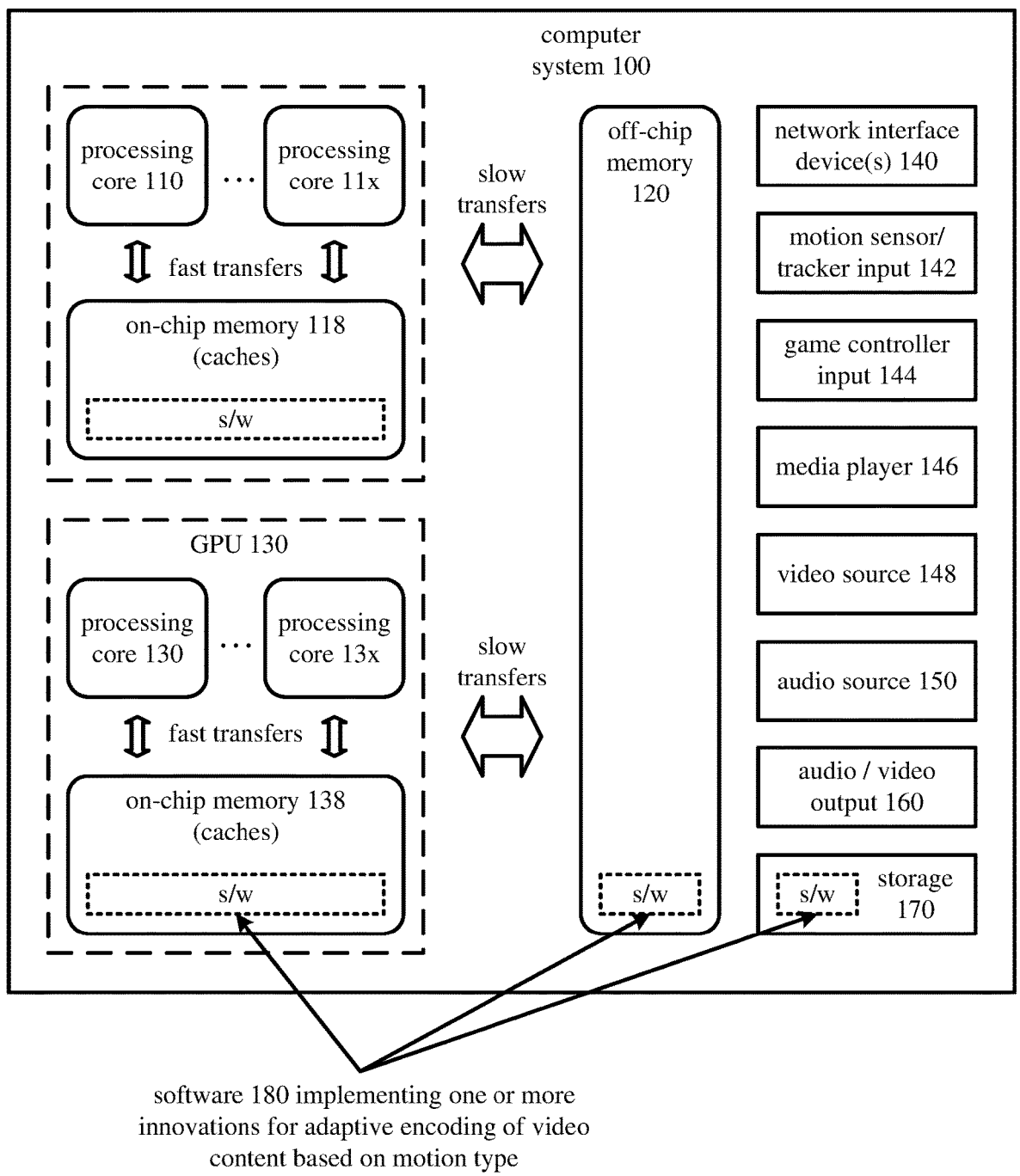
FIG. 1 is a diagram illustrating an example computer system in which some described embodiments can be implemented.

FIG. 1 illustrates a generalized example of a suitable computer system (100) in which several of the described innovations may be implemented. The innovations described herein relate to adaptive encoding of screen content (or other video content) based on motion type. Aside from its use in adaptive encoding of video content based on motion type, the computer system (100) is not intended to suggest any limitation as to scope of use or functionality, as the innovations may be implemented in diverse computer systems, including special-purpose computer systems adapted for video encoding.

With reference to FIG. 1, the computer system (100) includes one or more processing cores (110 . . . 11x) and local memory (118) of system-on-a-chip ("SoC"), application-specific integrated circuit ("ASIC"), central processing unit ("CPU"), or other integrated circuit. The processing core(s) (110 . . . 11x) are, for example, processing cores on a single chip, and execute computer-executable instructions. The number of processing core(s) (110 . . . 11x) depends on implementation and can be, for example, 4 or 8. The local memory (118) may be volatile memory (e.g., registers, cache, RAM), non-volatile memory (e.g., ROM, EEPROM, flash memory, etc.), or some combination of the two, accessible by the respective processing core(s) (110 . . . 11x).

The local memory (118) can store software (180) implementing one or more innovations for adaptive encoding of screen content (or other video content) based on motion type, for operations performed by the respective processing core(s) (110 . . . 11x), in the form of computer-executable instructions. In FIG. 1, the local memory (118) is on-chip memory such as one or more caches, for which access operations, transfer operations, etc. with the processing core(s) (110 . . . 11x) are fast.

The computer system (100) also includes processing cores (130 . . . 13x) and local memory (138) of a graphics processing unit ("GPU"). The number of processing cores (130 . . . 13x) of the GPU depends on implementation. The processing cores (130 . . . 13x) are, for example, part of single-instruction, multiple data ("SIMD") units of the GPU. The SIMD width n, which depends on implementation, indicates the number of elements (sometimes called lanes) of a SIMD unit. For example, the number of elements (lanes) of a SIMD unit can be 16, 32, 64, or 128 for an extra-wide SIMD architecture. The local memory (138) may be volatile memory (e.g., registers, cache, RAM), non-volatile memory (e.g., ROM, EEPROM, flash memory, etc.), or some combination of the two, accessible by the respective processing cores (130 . . . 13x).

The local memory (138) can store software (180) implementing one or more innovations for adaptive encoding of screen content (or other video content) based on motion type, for operations performed by the respective processing cores (130 . . . 13x), in the form of computer-executable instructions such as shader code. In FIG. 1, the local memory (138) is on-chip memory such as one or more caches, for which access operations, transfer operations, etc. with the processing cores (130 . . . 13x) are fast.

The computer system (100) includes shared memory (120), which may be volatile memory (e.g., RAM), non-volatile memory (e.g., ROM, EEPROM, flash memory, etc.), or some combination of the two, accessible by the processing core(s) (110 . . . 11x, 130 . . . 13x). The memory (120) stores software (180) implementing one or more innovations for adaptive encoding of screen content (or other video content) based on motion type, in the form of computer-executable instructions. In FIG. 1, the shared memory (120) is off-chip memory, for which access operations, transfer operations, etc. with the processing cores (110 . . . 11x, 130 . . . 13x) are slower.

Alternatively, the computer system (100) includes one or more processing cores of a CPU and associated memory, without a GPU. The processing core(s) of the CPU can execute computer-executable instructions for one or more innovations for adaptive encoding of screen content (or other video content) based on motion type.

More generally, the term "processor" may refer generically to any device that can process computer-executable instructions and may include a microprocessor, microcontroller, programmable logic device, digital signal processor, and/or other computational device. A processor may be a processing core of a CPU, other general-purpose unit, or GPU. A processor may also be a specific-purpose processor implemented using, for example, an ASIC or a field-programmable gate array ("FPGA").

The term "control logic" may refer to a controller or, more generally, one or more processors, operable to process computer-executable instructions, determine outcomes, and generate outputs. Depending on implementation, control logic can be implemented by software executable on a CPU, by software controlling special-purpose hardware (e.g., a GPU or other graphics hardware), or by special-purpose hardware (e.g., in an ASIC).

The computer system (100) includes one or more network interface devices (140). The network interface device(s) (140) enable communication over a network to another computing entity (e.g., server, other computer system). The network interface device(s) (140) can support wired connections and/or wireless connections, for a wide-area network, local-area network, personal-area network or other network. For example, the network interface device(s) can include one or more Wi-Fi transceivers, an Ethernet port, a cellular transceiver and/or another type of network interface device, along with associated drivers, software, etc. The network interface device(s) (140) convey information such as computer-executable instructions, audio or video input or output, or other data in a modulated data signal over network connection(s). A modulated data signal is a signal that has one or more of its characteristics set or changed in such a manner as to encode information in the signal. By way of example, and not limitation, the network connections can use an electrical, optical, RF, or other carrier.

The computer system (100) optionally includes a motion sensor/tracker input (142) for a motion sensor/tracker, which can track the movements of a user and objects around the user. For example, the motion sensor/tracker allows a user (e.g., player of a game) to interact with the computer system (100) through a natural user interface using gestures and spoken commands. The motion sensor/tracker can incorporate gesture recognition, facial recognition and/or voice recognition.

The computer system (100) optionally includes a game controller input (144), which accepts control signals from one or more game controllers, over a wired connection or wireless connection. The control signals can indicate user inputs from one or more directional pads, buttons, triggers and/or one or more joysticks of a game controller. The control signals can also indicate user inputs from a touchpad or touchscreen, gyroscope, accelerometer, angular rate sensor, magnetometer and/or other control or meter of a game controller.

The computer system (100) optionally includes a media player (146) and video source (148). The media player (146) can play DVDs, Blu-ray disks, other disk media and/or other formats of media. The video source (148) can be a camera input that accepts video input in analog or digital form from a video camera, which captures natural video. Or, the video source (148) can be a screen capture module (e.g., a driver of an operating system, or software that interfaces with an operating system) that provides screen capture content as input. Or, the video source (148) can be a graphics engine that provides texture data for graphics in a computer-represented environment. Or, the video source (148) can be a video card, TV tuner card, or other video input that accepts input video in analog or digital form (e.g., from a cable input, HDMI input or other input).

An optional audio source (150) accepts audio input in analog or digital form from a microphone, which captures audio, or other audio input.

The computer system (100) optionally includes a video output (160), which provides video output to a display device. The video output (160) can be an HDMI output or other type of output. An optional audio output (160) provides audio output to one or more speakers.

The storage (170) may be removable or non-removable, and includes magnetic media (such as magnetic disks, magnetic tapes or cassettes), optical disk media and/or any other media which can be used to store information and which can be accessed within the computer system (100). The storage (170) stores instructions for the software (180) implementing one or more innovations for adaptive encoding of screen content (or other video content) based on motion type.

The computer system (100) may have additional features. For example, the computer system (100) includes one or more other input devices and/or one or more other output devices. The other input device(s) may be a touch input device such as a keyboard, mouse, pen, or trackball, a scanning device, or another device that provides input to the computer system (100). The other output device(s) may be a printer, CD-writer, or another device that provides output from the computer system (100).

An interconnection mechanism (not shown) such as a bus, controller, or network interconnects the components of the computer system (100). Typically, operating system software (not shown) provides an operating environment for other software executing in the computer system (100), and coordinates activities of the components of the computer system (100).

The computer system (100) of FIG. 1 is a physical computer system. A virtual machine can include components organized as shown in FIG. 1.

The term "application" or "program" may refer to software such as any user-mode instructions to provide functionality. The software of the application (or program) can further include instructions for an operating system and/or device drivers. The software can be stored in associated memory. The software may be, for example, firmware. While it is contemplated that an appropriately programmed general-purpose computer or computing device may be used to execute such software, it is also contemplated that hard-wired circuitry or custom hardware (e.g., an ASIC) may be used in place of, or in combination with, software instructions. Thus, examples described herein are not limited to any specific combination of hardware and software.

The term "computer-readable medium" refers to any medium that participates in providing data (e.g., instructions) that may be read by a processor and accessed within a computing environment. A computer-readable medium may take many forms, including but not limited to non-volatile media and volatile media. Non-volatile media include, for example, optical or magnetic disks and other persistent memory. Volatile media include dynamic random access memory ("DRAM"). Common forms of computer-readable media include, for example, a solid state drive, a flash drive, a hard disk, any other magnetic medium, a CD-ROM, DVD, any other optical medium, RAM, programmable read-only memory ("PROM"), erasable programmable read-only memory ("EPROM"), a USB memory stick, any other memory chip or cartridge, or any other medium from which a computer can read. The term "computer-readable memory" specifically excludes transitory propagating signals, carrier waves, and wave forms or other intangible or transitory media that may nevertheless be readable by a computer. The term "carrier wave" may refer to an electromagnetic wave modulated in amplitude or frequency to convey a signal.

The innovations can be described in the general context of computer-executable instructions being executed in a computer system on a target real or virtual processor. The computer-executable instructions can include instructions executable on processing cores of a general-purpose processor to provide functionality described herein, instructions executable to control a GPU or special-purpose hardware to provide functionality described herein, instructions executable on processing cores of a GPU to provide functionality described herein, and/or instructions executable on processing cores of a special-purpose processor to provide functionality described herein. In some implementations, computer-executable instructions can be organized in program modules. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computer system.

The terms "system" and "device" are used interchangeably herein. Unless the context clearly indicates otherwise, neither term implies any limitation on a type of computer system or device. In general, a computer system or device can be local or distributed, and can include any combination of special-purpose hardware and/or hardware with software implementing the functionality described herein.

Numerous examples are described in this disclosure, and are presented for illustrative purposes only. The described examples are not, and are not intended to be, limiting in any sense. The presently disclosed innovations are widely applicable to numerous contexts, as is readily apparent from the disclosure. One of ordinary skill in the art will recognize that the disclosed innovations may be practiced with various modifications and alterations, such as structural, logical, software, and electrical modifications. Although particular features of the disclosed innovations may be described with reference to one or more particular examples, it should be understood that such features are not limited to usage in the one or more particular examples with reference to which they are described, unless expressly specified otherwise. The present disclosure is neither a literal description of all examples nor a listing of features of the invention that must be present in all examples.

When an ordinal number (such as "first," "second," "third" and so on) is used as an adjective before a term, that ordinal number is used (unless expressly specified otherwise) merely to indicate a particular feature, such as to distinguish that particular feature from another feature that is described by the same term or by a similar term. The mere usage of the ordinal numbers "first," "second," "third," and so on does not indicate any physical order or location, any ordering in time, or any ranking in importance, quality, or otherwise. In addition, the mere usage of ordinal numbers does not define a numerical limit to the features identified with the ordinal numbers.

When introducing elements, the articles "a," "an," "the," and "said" are intended to mean that there are one or more of the elements. The terms "comprising," including," and "having" are intended to be inclusive and mean that there may be additional elements other than the listed elements.

When a single device, component, module, or structure is described, multiple devices, components, modules, or structures (whether or not they cooperate) may instead be used in place of the single device, component, module, or structure. Functionality that is described as being possessed by a single device may instead be possessed by multiple devices, whether or not they cooperate. Similarly, where multiple devices, components, modules, or structures are described herein, whether or not they cooperate, a single device, component, module, or structure may instead be used in place of the multiple devices, components, modules, or structures. Functionality that is described as being possessed by multiple devices may instead be possessed by a single device. In general, a computer system or device can be local or distributed, and can include any combination of special-purpose hardware and/or hardware with software implementing the functionality described herein.

Further, the techniques and tools described herein are not limited to the specific examples described herein. Rather, the respective techniques and tools may be utilized independently and separately from other techniques and tools described herein.

Device, components, modules, or structures that are in communication with each other need not be in continuous communication with each other, unless expressly specified otherwise. On the contrary, such devices, components, modules, or structures need only transmit to each other as necessary or desirable, and may actually refrain from exchanging data most of the time. For example, a device in communication with another device via the Internet might not transmit data to the other device for weeks at a time. In addition, devices, components, modules, or structures that are in communication with each other may communicate directly or indirectly through one or more intermediaries.

As used herein, the term "send" denotes any way of conveying information from one device, component, module, or structure to another device, component, module, or structure. The term "receive" denotes any way of getting information at one device, component, module, or structure from another device, component, module, or structure. The devices, components, modules, or structures can be part of the same computer system or different computer systems. Information can be passed by value (e.g., as a parameter of a message or function call) or passed by reference (e.g., in a buffer). Depending on context, information can be communicated directly or be conveyed through one or more intermediate devices, components, modules, or structures. As used herein, the term "connected" denotes an operable communication link between devices, components, modules, or structures, which can be part of the same computer system or different computer systems. The operable communication link can be a wired or wireless network connection, which can be direct or pass through one or more intermediaries (e.g., of a network).

A description of an example with several features does not imply that all or even any of such features are required. On the contrary, a variety of optional features are described to illustrate the wide variety of possible examples of the innovations described herein. Unless otherwise specified explicitly, no feature is essential or required.

Further, although process steps and stages may be described in a sequential order, such processes may be configured to work in different orders. Description of a specific sequence or order does not necessarily indicate a requirement that the steps/stages be performed in that order. Steps or stages may be performed in any order practical. Further, some steps or stages may be performed simultaneously despite being described or implied as occurring non-simultaneously. Description of a process as including multiple steps or stages does not imply that all, or even any, of the steps or stages are essential or required. Various other examples may omit some or all of the described steps or stages. Unless otherwise specified explicitly, no step or stage is essential or required. Similarly, although a product may be described as including multiple aspects, qualities, or characteristics, that does not mean that all of them are essential or required. Various other examples may omit some or all of the aspects, qualities, or characteristics.

An enumerated list of items does not imply that any or all of the items are mutually exclusive, unless expressly specified otherwise. Likewise, an enumerated list of items does not imply that any or all of the items are comprehensive of any category, unless expressly specified otherwise.

For the sake of presentation, the detailed description uses terms like "determine" and "select" to describe computer operations in a computer system. These terms denote operations performed by one or more processors or other components in the computer system, and should not be confused with acts performed by a human being. The actual computer operations corresponding to these terms vary depending on implementation.

II. Example Network Environments

Figure 2A:
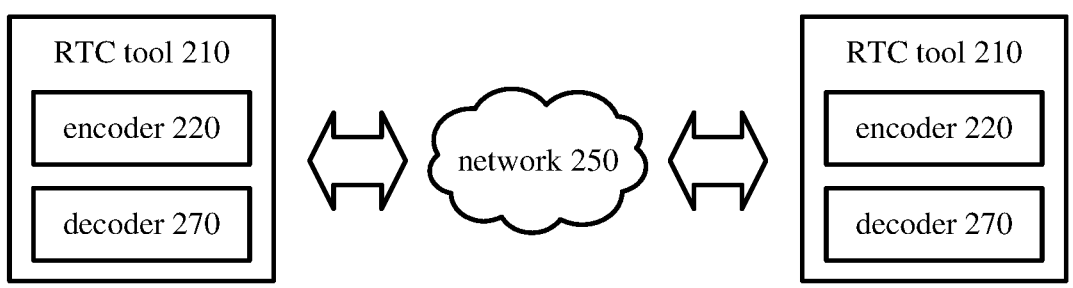
FIGS. 2a and 2b are diagrams illustrating example network environments in which some described embodiments can be implemented.
Figure 2B:
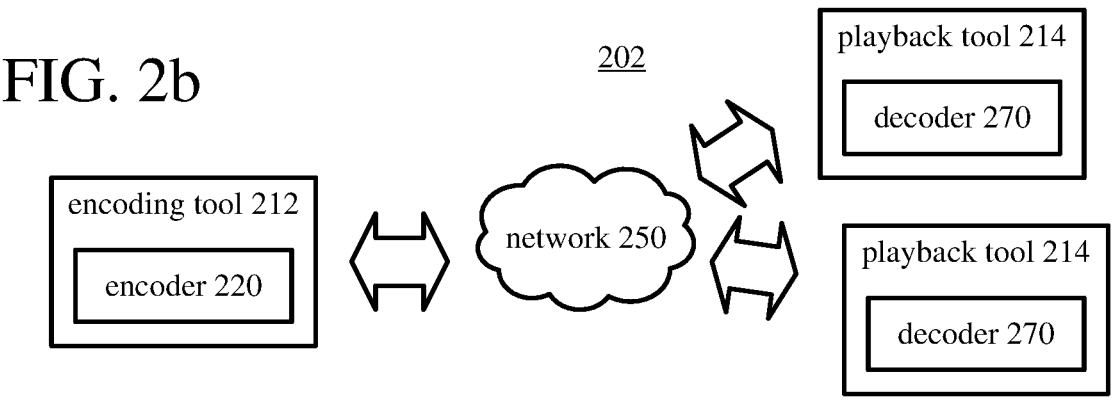

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with the AV1 standard, VP8 standard, VP9 standard, H.265 standard, H.264 standard, or a variation or extension thereof, or another codec standard or format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

A real-time communication tool (210) is configured to manage encoding by an encoder (220). FIG. 4 shows an example encoder system (400) that can be included in the real-time communication tool (210). Alternatively, the real-time communication tool (210) uses another encoder system. A real-time communication tool (210) is also configured to manage decoding by a decoder (270).

In the network environment (202) shown in FIG. 2b, an encoding tool (212) includes an encoder (220) that is configured to encode media for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations for playback. Although the network environment (202) in FIG. 2b includes two playback tools (214), the network environment (202) can include more or fewer playback tools (214). In general, a playback tool (214) is configured to communicate with the encoding tool (212) to determine a stream of encoded media for the playback tool (214) to receive. The playback tool (214) is configured to receive the stream, buffer the received encoded data for an appropriate period, and begin decoding and playback.

FIG. 4 shows an example encoder system (400) that can be included in the encoding tool (212). Alternatively, the encoding tool (212) uses another encoder system. The encoding tool (212) can also include server-side controller logic for managing connections with one or more playback tools (214). A playback tool (214) can also include client-side controller logic for managing connections with the encoding tool (212).

III. Example Video Encoder Systems

Figure 3:
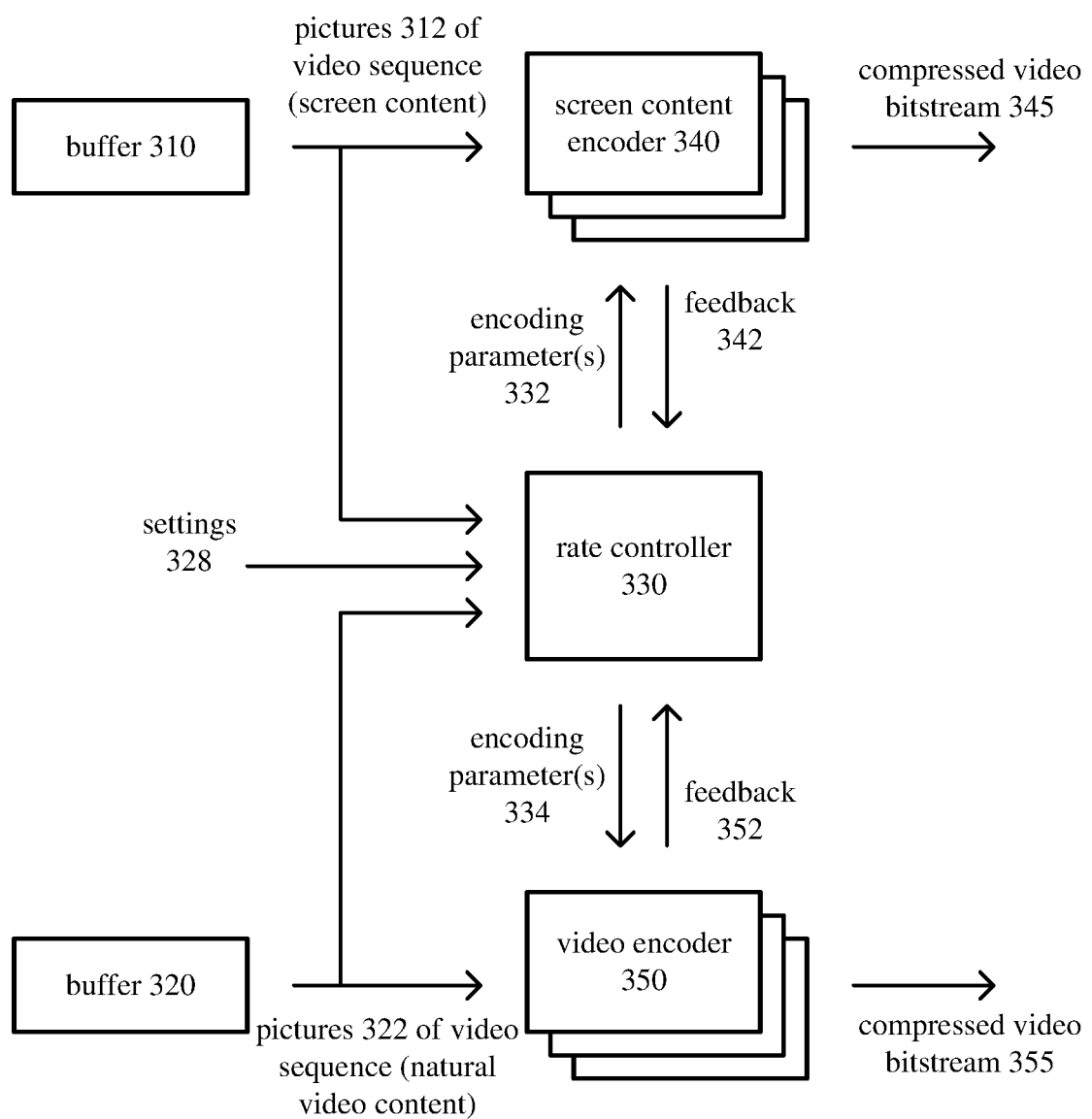
FIG. 3 is a diagram illustrating an example video encoder system, including multiple types of video encoders and a rate controller, in which some described embodiments can be implemented.

FIG. 3 is a block diagram of an example video encoder system (300), including multiple types of video encoders and a rate controller, in which some described embodiments can be implemented. The video encoder system (300) is a special-purpose encoding tool adapted for low-latency encoding mode for real-time communication. Alternatively, the video encoder system (300) can be a general-purpose encoding tool capable of operating in any of multiple encoding modes such as a low-latency encoding mode for real-time communication, a transcoding mode, and a higher-latency encoding mode for producing media for playback from a file or stream. The video encoder system (300) can be implemented as an operating system module, as part of an application library, or as a standalone application.

The video encoder system (300) includes two buffers (310, 320), a rate controller (330), and multiple types of encoders (340, 350). Alternatively, the video encoder system (300) can include one or more additional types of encoders, each having an associated buffer. Or, as another alternative, the video encoder system (300) can include a single type of encoder with an associated buffer. FIG. 4 shows a video encoder system (400) from a different perspective, with additional details for some components of the video encoder system (300) shown in FIG. 3.

In FIG. 3, the buffer (310) receives and stores pictures (312) of screen content from a video source such as a screen capture module or operating system. The pictures are part of a series in a video sequence. The buffer (310) provides the pictures (312) to one or more screen content encoders (340). The buffer (310) is an example of the source picture temporary memory storage area (420) shown in FIG. 4.

The buffer (320) receives and stores pictures (322) of natural video content from a video source such as a camera. The pictures are part of a series in a video sequence. The buffer (320) provides the pictures (322) to one or more screen content encoders (350). The buffer (320) is another example of the source picture temporary memory storage area (420) shown in FIG. 4.

The rate controller (330) receives the pictures (312, 322) from the buffers (310, 320) and also receives feedback (342, 352) from the encoders (340, 350). The rate controller (330) sets encoding parameters (332, 334) for the respective encoders (340, 350). For example, the encoding parameter(s) (332) provided to one of the screen content encoder(s) (340) include a target bit rate, a frame rate for encoding, and/or a spatial resolution for pictures to be encoded by that screen content encoder (340). Similarly, the encoding parameter(s) (334) provided to one of the video encoder(s) (350) include a target bit rate, a frame rate for encoding, and/or a spatial resolution for pictures to be encoded by that video encoder (350). Alternatively, the encoding parameters (332, 334) include other and/or additional parameters. As one of the encoding parameters (332, 334), the rate controller (330) can switch between different ones of the screen content encoders (340) or switch between different ones of the video encoders (350). For example, the video encoder system (300) can include multiple screen content encoders (340), with one of the screen content encoders (340) being used for low-motion video, and a different one of the screen content encoders (340) being used for high-motion video.

The feedback (342) from one of the screen content encoder(s) (340) can include, for example, bit rate of encoded data, quantization parameter ("QP") values for the encoded data, and values of other parameters for the encoded data. Similarly, the feedback (352) from one of the video encoder(s) (350) can include, for example, bit rate of encoded data, QP values for the encoded data, and values of other parameters for the encoded data. In particular, the rate controller (330) performs operations to control adaptive encoding of screen content (or other video content) based on motion type, as described below.

One of the screen content encoder(s) (340) receives the pictures (312) of screen content from the buffer (310) and compresses the pictures (312) to produce a compressed video bitstream (345). The screen content encoder (340) performs compression according to the encoder parameter(s) (332) received from the rate controller (330). The screen content encoder (340) provides feedback (342) on the results of compression to the rate controller (330). The screen content encoder (340) can include components as described with reference to FIGS. 5a and 5b, or it can include other components.

One of the video encoder(s) (350) receives the pictures (322) of natural video content from the buffer (320) and compresses the pictures (322) to produce a compressed video bitstream (355). The video encoder (350) performs compression according to the encoder parameter(s) (334) received from the rate controller (330). The video encoder (350) provides feedback (352) on the results of compression to the rate controller (330). The video encoder (350) can include components as described with reference to FIGS. 5a and 5b, or it can include other components.

FIG. 4 is a block diagram of an example video encoder system (400) in conjunction with which some described embodiments may be implemented. The video encoder system (400) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The video encoder system (400) can be adapted for encoding a particular type of content (e.g., screen content, or natural video content). The video encoder system (400) can be implemented as an operating system module, as part of an application library, or as a standalone application. Overall, the video encoder system (400) receives a sequence of source video pictures (411) from a video source (410) and produces encoded data as output to a channel (490). The encoded data output to the channel can include content encoded using adaptive encoding based on motion type.

The video source (410) can be a camera, tuner card, storage media, screen capture module, or other digital video source. The video source (410) produces a sequence of video pictures at a frame rate of, for example, 30 frames per second. As used herein, the term "picture" generally refers to source, coded, or reconstructed image data. For progressive-scan video, a picture is a progressive-scan video frame. For interlaced video, an interlaced video frame can be de-interlaced prior to encoding. Alternatively, two complementary interlaced video fields can be encoded together as a single video frame or encoded as two separately encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (411) is stored in a source picture temporary memory storage area (420) that includes multiple picture buffer storage areas (421, 422, . . . , 42n). A picture buffer (421, 422, etc.) holds one picture in the source picture storage area (420). After one or more of the source pictures (411) have been stored in picture buffers (421, 422, etc.), a picture selector (430) selects an individual source picture from the source picture storage area (420). The order in which pictures are selected by the picture selector (430) for input to the encoder (440) may differ from the order in which the pictures are produced by the video source (410), e.g., the encoding of some pictures may be delayed in order, so as to allow some later pictures to be encoded first and to thus facilitate temporally backward prediction. Before the encoder (440), the video encoder system (400) can include a pre-processor (not shown) that performs pre-processing (e.g., filtering) of the selected picture (431) before encoding. The pre-processing can include color space conversion into primary (e.g., luma) and secondary (e.g., chroma differences toward red and toward blue) components and resampling processing (e.g., to reduce the spatial resolution of chroma components, or for all components) for encoding. Typically, before encoding, video has been converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format), in which the color components are organized as primary and secondary components. Screen capture content is often encoded in a format (e.g., YUV 4:4:4 or RGB 4:4:4) with high chroma sampling resolution, although it may also be encoded in a format with lower chroma sampling resolution (e.g., YUV 4:2:0).

The rate controller (435) is an example of the rate controller (330) of FIG. 3. The rate controller (435) receives the pictures (431) from the selector (430) (or pre-processor, which is not shown) and also receives feedback (443) from the encoder (440). The rate controller (435) sets one or more encoding parameters (438) for the encoder (440). For example, the encoding parameter(s) (438) include a target bit rate, a frame rate for encoding, and/or a spatial resolution for pictures to be encoded by the encoder (440). Alternatively, the encoding parameter(s) (438) include other and/or additional parameters. As one of the encoding parameter(s) (438), the rate controller (435) can switch between different encoders. The feedback (443) from the encoder (440) can include, for example, bit rate of encoded data, QP values for the encoded data, and values of other parameters for the encoded data. The rate controller (435) can provide feedback to the pre-processor (e.g., a spatial resolution for pictures to be encoded). In particular, the rate controller (435) performs operations to control adaptive encoding of screen content (or other video content) based on motion type, as described below.

Figure 5A:
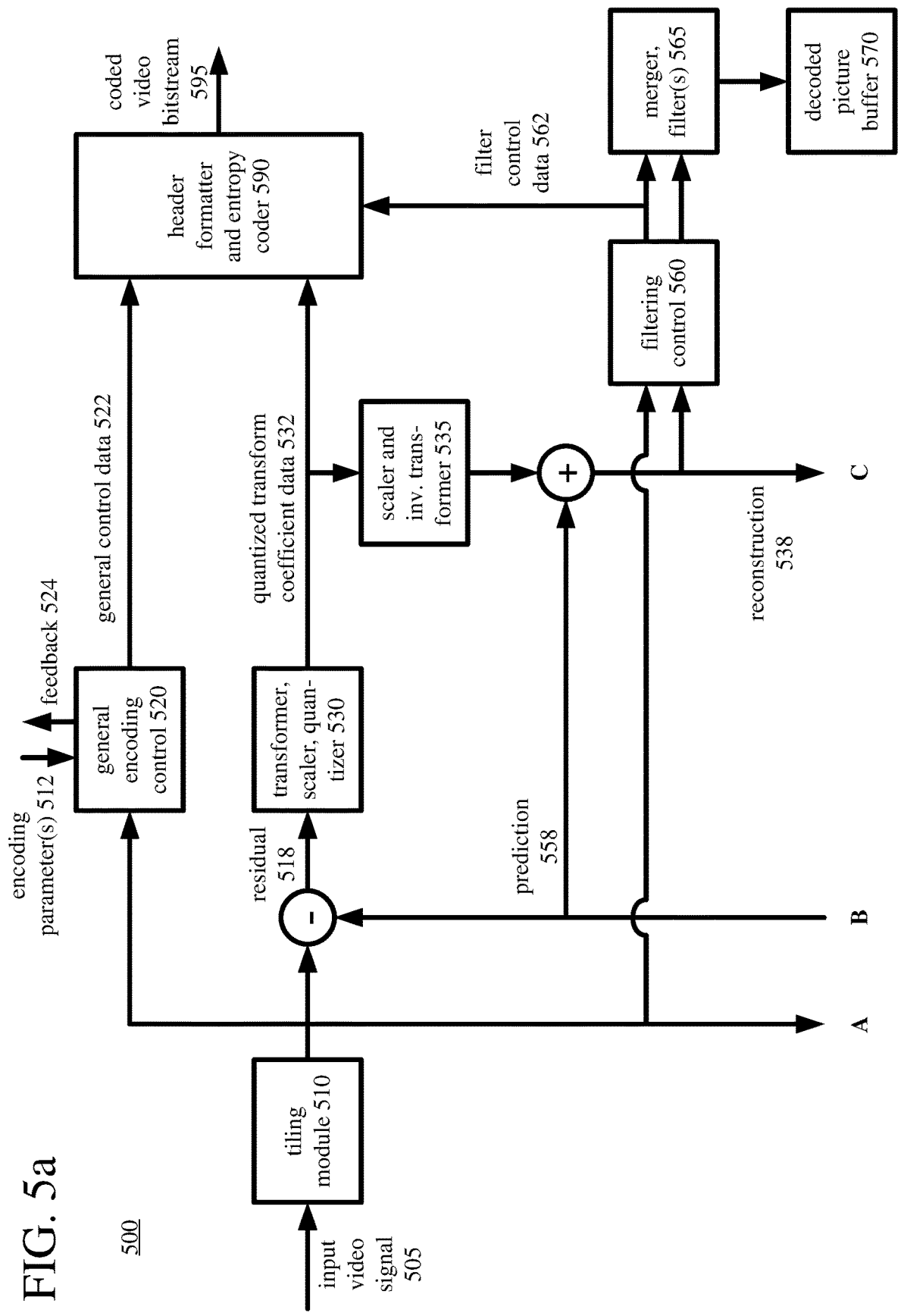
FIGS. 5a and 5b are diagrams illustrating an example video encoder in conjunction with which some described embodiments can be implemented.
Figure 5B:
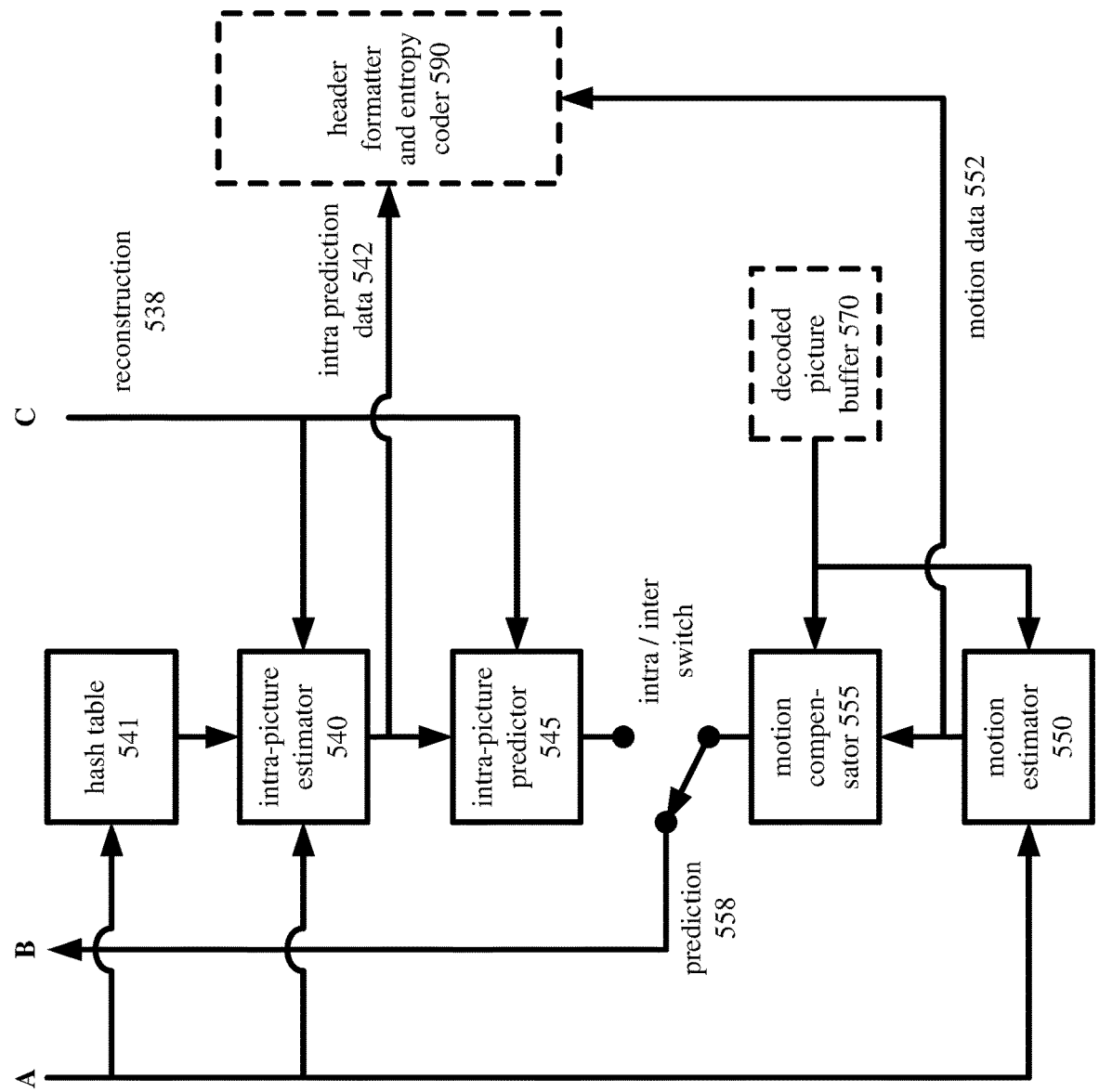

The encoder (440) is an example of a screen content encoder (340) or video encoder (350) shown in FIG. 3. The encoder (440) encodes the selected picture (431) to produce a coded picture (441). FIGS. 5a and 5b are block diagrams of a generalized video encoder (500) in conjunction with which some described embodiments may be implemented. The encoder (500) receives the selected, current picture (431) from a sequence of video pictures as an input video signal (505) and produces encoded data for the coded picture (441) in a coded video bitstream (595) as output. The codec format of the coded video bitstream (595) can be H.264/AVC format, H.265/HEVC format, AV1 format, or another codec format, or a variation or extension thereof.

The encoder (500) compresses pictures using intra-picture coding and inter-picture coding. Many of the components of the encoder (500) are used for both intra-picture coding and inter-picture coding. The exact operations performed by those components can vary depending on the codec format and the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. Tiles are often used to provide options for parallel processing. In implementations for the AV1 format, the encoder (500) can also partition a picture into segments, and parameters of blocks (or superblocks) of a given segment can be collectively signaled for the given segment, which can improve compression efficiency. In implementations for the H.264/AVC format or H.265/HEVC format, the encoder (500) partitions a picture into one or more slices. A slice can be an entire picture or a section of the picture. A slice can be decoded independently of other slices in a picture, which improves error resilience.

The content of a picture (or tile, slice, etc.) is further partitioned into blocks of sample values for purposes of encoding and decoding. The encoder (500) is block-based and uses a block format that depends on implementation. Blocks may be further sub-divided at different stages, e.g., at the prediction, frequency transform and/or entropy encoding stages. For example, a picture can be divided into 256×256 blocks, 128×128 blocks, 64×64 blocks, 32×32 blocks, or 16×16 blocks, which can in turn be divided into smaller blocks of sample values at different stages of coding and decoding.

In implementations of encoding for the AV1 format, for example, the encoder (500) partitions a picture (or tile) into superblocks. A superblock ("SB") includes luma sample values organized as a luma block and corresponding chroma sample values organized as chroma blocks. A root SB with size 128×128 can be recursively partitioned into smaller square SBs of size 64×64, 32×32, 16×16, or 8×8. A given square 2N×2N SB can also be partitioned into two rectangular N×2N or 2N×N SBs, in which case the smaller N×2N or 2N×N SBs are not further partitioned. Thus, the size of an SB can be 128×128, 128×64, 64×128, 64×64, 64×32, 32×64, 32×32, 32×16, 16×32, 16×16, 16×8, 8×16, or 8×8. Further, an 8×8 SB can be split into two 8×4 SBs, two 4×8 SBs, or four 4×4 SBs for some operations.

Generally, prediction operations are performed for an SB as a prediction unit. An SB may be split into smaller blocks for transform operations, or multiple SBs may be combined for a transform that covers multiple prediction units (SBs). Parameters such as prediction mode (inter or intra), MV data, reference picture data, interpolation filter type, transform size and type, skip status, and segment index are typically specified for an SB. For a small SB (e.g., 8×4 SB, 4×8 SB, or 4×4 SB), however, some parameters (such as prediction mode and MV data) can be signaled for the small SB while other parameters are signaled for the 8×8 SB that includes the small SB.

In implementations of encoding for the H.265/HEVC format, for example, the encoder (500) splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. A CTU can be split into four CUs, with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC format, for an intra-predicted CU, the PU has the same size as the CU, unless the CU has the smallest size (e.g., 8×8). In that case, the CU can be split into smaller PUs (e.g., four 4×4 PUs, two 4×8 PUs, or two 8×4 PUs, if the smallest CU size is 8×8, for intra-picture prediction) or the PU can have the smallest CU size, as indicated by a syntax element for the CU. Alternatively, a larger CU can be split into multiple PUs. A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

In implementations of encoding for the H.264/AVC format, for example, the encoder (500) splits the content of a picture (or slice) into macroblocks. A macroblock ("MB") includes luma sample values organized as luma blocks and corresponding chroma sample values organized as chroma blocks. The size of a MB is, for example, 16×16 luma sample values, with corresponding blocks of chroma sample values. Variable-size partitions of a macroblock are encoded using prediction, and 8×8 or 4×4 blocks are used for purposes of residual coding/decoding.

As used herein, the term "block" can indicate an m×n arrangement of sample values, a residual data unit, a CTB, a CB, a PB, a TB, or some other set of sample values, depending on context. A block can be square or rectangular, or even a single column or row of sample values. Alternatively, a block can have some other shape (e.g., triangle, hexagon, arbitrary shape, or an area of a coded video object with a non-rectangular shape). Blocks can have sizes that vary within a picture. Prediction and transform operations can be performed on a block-by-block basis. The term "unit" can indicate an SB, a macroblock, a CTU, a CU, a PU, a TU, or some other set of blocks, or it can indicate a single block, depending on context. Units can have sizes that vary within a picture. A luma block is an example of a primary component block for a YUV color space. The label "luma block" is sometimes used, however, to indicate a primary component block even for another color space such as an RGB color space, BGR color space, or GBR color space. Similarly, a chroma block is an example of a secondary component block for a YUV color space. The label "chroma block" is sometimes used, however, to indicate a secondary component block even for another color space such as an RGB color space, BGR color space, or GBR color space.

With reference to FIG. 5a, the general encoding control (520) receives pictures for the input video signal (505), encoding parameter(s) (512) from a rate controller (such as the rate controller (330, 435) of FIG. 3 or 4), and feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), intra-picture predictor (545), motion estimator (550), motion compensator (555) and intra/inter switch) to set and change coding parameters during encoding. The general encoding control (520) also provides feedback (524) to the rate controller. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of a current picture of the input video signal (505) with respect to candidate blocks in one or more reference pictures. For example, the motion estimator (550) estimates the motion of a current block in the current picture relative to one or more reference pictures. For motion estimation and compensation, a reference block is a block of sample values in a reference picture that is used to generate prediction values for the current block of sample values of the current picture. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values or other MV selection data, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for blocks in the current picture.

In a separate path within the encoder (500), an intra-picture estimator (540) determines how to perform intra-picture prediction for blocks of sample values of a current picture of the input video signal (505) using other, previously reconstructed sample values in the current picture. The current picture can be entirely or partially coded using intra-picture coding. Using sample values of a reconstruction (538) of the current picture, for intra spatial prediction (extrapolation), the intra-picture estimator (540) determines how to spatially predict sample values of a current block in the current picture from neighboring, previously reconstructed sample values of the current picture.

Or, for intra BC prediction, the intra-picture estimator (540) estimates displacement from a current block in the current picture to a position of a candidate block in previously reconstructed sample values of the current picture. For intra BC prediction, a reference block of sample values in the current picture is used to generate prediction values for the current block. For example, for intra BC prediction, the intra-picture estimator (540) estimates displacement from a current block to a reference block, which can be indicated with a BV value.

Depending on implementation, the intra-picture estimator (540) can perform BV estimation for the current block using reconstructed sample values before in-loop filtering, using reconstructed sample values after in-loop filtering, or using input sample values. The intra-picture estimator (540) produces as side information intra prediction data (542), such as information indicating whether intra prediction uses spatial prediction or intra BC prediction, prediction mode direction (for intra spatial prediction), and BV values (for intra BC prediction). The intra prediction data (542) is provided to the header formatter/entropy coder (590) as well as the intra-picture predictor (545).

According to the intra prediction data (542), the intra-picture predictor (545) spatially predicts sample values of a current block in the current picture from neighboring, previously reconstructed sample values of the current picture. Or, for intra BC prediction, the intra-picture predictor (545) predicts the sample values of a current block using previously reconstructed sample values of a reference block, which is indicated by a displacement (BV value) for the current block.

In some example implementations, intra BC prediction is a special case of motion compensation for which the reference picture is the current picture. In such implementations, functionality described above with reference to the intra-picture estimator (540) and intra-picture predictor (545) for BV estimation and intra BC prediction can be implemented in the motion estimator (550) and motion compensator (555), respectively.

For motion compensation and intra BC prediction, an encoder typically finds a single MV or BV value for a prediction unit, and that single MV or BV value (or a scaled version thereof) is used for the blocks of the prediction unit. When the chroma data for a picture has the same resolution as the luma data (e.g. when the format is YUV 4:4:4 format or RGB 4:4:4 format), the MV or BV value that is applied for the chroma block may be the same as the MV or BV value applied for the luma block. On the other hand, when the chroma data for a picture has reduced resolution relative to the luma data (e.g. when the format is YUV 4:2:0 format), the MV or BV value that is applied for the chroma block may be scaled down and possibly rounded to adjust for the difference in chroma resolution (e.g. by dividing the vertical and horizontal components of the BV value by two and truncating or rounding them to integer values).

For a palette coding mode, the encoder (500) represents at least some of the sample values of a unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel, where a pixel is a set of co-located sample values.

For encoding of the unit, appropriate index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (558) for a given block will be a motion-compensated prediction or intra-picture prediction.

In some example implementations, no residual is calculated for a unit encoded in palette coding mode. Instead, residual coding is skipped, and the predicted sample values are used as the reconstructed sample values. Residual coding can selectively be skipped for other blocks.

When residual coding is not skipped, the difference (if any) between a block of the prediction (558) and a corresponding part of the original current picture of the input video signal (505) provides values of the residual (518). During reconstruction of the current picture, when residual values have been encoded/signaled, reconstructed residual values are combined with the prediction (558) to produce an approximate or exact reconstruction (538) of the original content from the video signal (505). (In lossy compression, some information is lost from the video signal (505).)

As part of residual coding, in the transformer/scaler/quantizer (530), when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. The scaler/quantizer scales and quantizes the transform coefficients. The encoder (500) can set values for QP for a picture, tile, slice and/or other portion of video, and quantize transform coefficients accordingly. For example, the quantizer applies dead-zone scalar quantization to the frequency-domain data with a quantization step size that varies on a picture-by-picture basis, tile-by-tile basis, slice-by-slice basis, block-by-block basis, frequency-specific basis, or other basis. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

To reconstruct residual values, in the scaler/inverse transformer (535), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (500) combines reconstructed residual values with values of the prediction (558) (e.g., motion-compensated prediction values, intra-picture prediction values) to form the reconstruction (538). When residual values have not been encoded/signaled, the encoder (500) uses the values of the prediction (558) as the reconstruction (538).

For intra-picture prediction, the values of the reconstruction (538) can be fed back to the intra-picture estimator (540) and intra-picture predictor (545). The values of the reconstruction (538) can be used for motion-compensated prediction of subsequent pictures.

The values of the reconstruction (538) can be further filtered. A filtering control (560) determines how to perform adaptive deblock filtering, sample adaptive offset ("SAO") filtering, and/or other filtering on values of the reconstruction (538), for a given picture of the video signal (505), within the motion compensation loop (that is, "in-loop" filtering). The filtering control (560) produces filter control data (562), which is provided to the header formatter/entropy coder (590) and merger/filter(s) (565).

In the merger/filter(s) (565), the encoder (500) merges content from different units (and tiles) into a reconstructed version of the picture. The encoder (500) selectively performs deblock filtering, SAO filtering, and/or other filtering (such as constrained directional enhancement filtering or loop restoration filtering) according to the filter control data (562) and rules for filter adaptation, so as to adaptively smooth discontinuities across boundaries in the pictures. Filtering such as de-ringing filtering or adaptive loop filtering (not shown) can alternatively or additionally be applied. Tile boundaries can be selectively filtered or not filtered at all, depending on settings of the encoder (500), and the encoder (500) may provide syntax elements within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522) (e.g., mode decisions), quantized transform coefficient data (532), intra prediction data (542) (e.g., BV values), motion data (552), and filter control data (562). For the motion data (552), the header formatter/entropy coder (590) can select and entropy code merge mode index values, or a default MV predictor can be used. In some cases, the header formatter/entropy coder (590) also determines MV differentials for MV values (relative to MV predictors for the MV values), then entropy codes the MV differentials. For the intra prediction data (542), a BV value can be encoded using prediction. The prediction can use a default predictor (e.g., a BV value from a neighboring unit, or median of BV values from multiple neighboring units). When multiple predictors are possible, a predictor index can indicate which of the multiple predictors to use for prediction of the BV value. The header formatter/entropy coder (590) can select and entropy code predictor index values (for intra BC prediction), or a default predictor can be used. In some cases, the header formatter/entropy coder (590) also determines differentials (relative to predictors for the BV values), then entropy codes the BV differentials. For palette coding mode, the header formatter/entropy coder (590) can encode palette data.

The header formatter/entropy coder (590) can perform entropy coding in various ways. Typical entropy coding techniques include Exponential-Golomb coding, Golomb-Rice coding, context-adaptive binary arithmetic coding ("CABAC"), differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The header formatter/entropy coder (590) can use different coding techniques for different kinds of data, can apply multiple techniques in combination (e.g., by applying Golomb-Rice coding followed by CABAC), and can choose from among multiple code tables or contexts within a particular coding technique.

The header formatter/entropy coder (590) provides the encoded data in the coded video bitstream (595). The codec format of the coded video bitstream (595) can be H.264/AVC format, H.265/HEVC format, AV1 format, or another codec format, or a variation or extension thereof.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

With reference to FIG. 4, in addition to producing encoded data for a coded picture (441), the encoder (440) produces memory management control operation ("MMCO") signals (442) or reference picture set ("RPS") information. The RPS is the set of pictures that may be used for reference in motion compensation for a current picture or any subsequent picture. If the current picture is not the first picture that has been encoded, when performing its encoding process, the encoder (440) may use one or more previously encoded/decoded pictures (469) that have been stored in a decoded picture temporary memory storage area (460), which is an example of decoded picture buffer (470). Such stored decoded pictures (469) are used as reference pictures for inter-picture prediction of the content of the current source picture (431). The MMCO/RPS information (442) indicates to a decoder which reconstructed pictures may be used as reference pictures, and hence should be stored in a picture storage area.

The coded pictures (441) and MMCO/RPS information (442) (or information equivalent to the MMCO/RPS information (442), since the dependencies and ordering structures for pictures are already known at the encoder (440)) are processed by a decoding process emulator (450) in the encoder system (400) of FIG. 4. The decoding process emulator (450) implements some of the functionality of a decoder, for example, decoding tasks to reconstruct sample values of the current picture and reference pictures. (In practice, the decoding process emulator (450) is implemented as part of the encoder (440). For example, the decoding process emulator (450) includes the scaler and inverse transformer (435), the merger/filters (465) and other functionality to reconstruct sample values.) In a manner consistent with the MMCO/RPS information (442), the decoding processes emulator (450) determines whether a given coded picture (441) needs to be reconstructed and stored for use as a reference picture in inter-picture prediction of subsequent pictures to be encoded. If a coded picture (441) needs to be stored, the decoding process emulator (450) models the decoding process that would be conducted by a decoder that receives the coded picture (441) and produces a corresponding decoded picture (451). In doing so, when the encoder (440) has used decoded picture(s) (469) that have been stored in the decoded picture storage area (460), the decoding process emulator (450) also uses the decoded picture(s) (469) from the storage area (460) as part of the decoding process.

The decoded picture temporary memory storage area (460) includes multiple picture buffer storage areas (461, 462, ..., 46n). In a manner consistent with the MMCO/RPS information (442), the decoding process emulator (450) manages the contents of the storage area (460) in order to identify any picture buffers (461, 462, etc.) with pictures that are no longer needed by the encoder (440) for use as reference pictures. After modeling the decoding process, the decoding process emulator (450) stores a newly decoded picture (451) in a picture buffer (461, 462, etc.) that has been identified in this manner.

The coded pictures (441) and MMCO/RPS information (442) are buffered in a temporary coded data area (470). The coded data that is aggregated in the coded data area (470) contains, as part of the syntax of an elementary coded video bitstream, encoded data for one or more pictures represented with syntax elements for various layers of bitstream syntax. The coded data that is aggregated in the coded data area (470) can also include media metadata relating to the coded video data (e.g., as one or more parameters in one or more supplemental enhancement information ("SEI") messages or video usability information ("VUI") messages).

The aggregated data (471) from the temporary coded data area (470) is processed by a channel encoder (480). The channel encoder (480) can packetize and/or multiplex the aggregated data for transmission or storage as a media stream (e.g., according to a media program stream or transport stream format), in which case the channel encoder (480) can add syntax elements as part of the syntax of the media transmission stream. Or, the channel encoder (480) can organize the aggregated data for storage as a file (e.g., according to a media container format), in which case the channel encoder (480) can add syntax elements as part of the syntax of the media storage file. Or, more generally, the channel encoder (480) can implement one or more media system multiplexing protocols or transport protocols, in which case the channel encoder (480) can add syntax elements as part of the syntax of the protocol(s). The channel encoder (480) provides output to a channel (490), which represents storage, a communications connection, or another channel for the output. The channel encoder (480) or channel (490) may also include other elements (not shown), e.g., for forward-error correction ("FEC") encoding and analog signal modulation.

IV. Examples of Adaptive Encoding of Video Content Based on Motion Type

This section presents various features of adaptive encoding of screen content (or other video content) based on motion type. In some examples, a video encoder system receives a current picture of a video sequence. The video encoder system determines a current motion type for the video sequence and, based at least in part on the current motion type, sets one or more encoding parameters. Then, the video encoder system encodes the current picture according to the encoding parameter(s). The adaptive encoding based on motion type can be used in real-time encoding scenarios when encoding screen content for a screen sharing application, desktop conferencing application, or other application. In some cases, compared to prior approaches, the innovations allow a video encoder system to adapt compression to different characteristics of video content at different times within the same video sequence.

When a video encoder system compresses video content, the video encoder system may need to reduce temporal resolution (frame rate) or spatial resolution in order to reach a target bit rate level or lower the computational complexity of compression. This might happen, for example, when video content becomes more complex, when the available network bandwidth drops, when the target bit rate level drops because bit rate has been allocated to other content, or when the video encoder system loses resources to other processes.

In some prior approaches, a user can configure a video encoder system to favor smooth playback or crisp playback of reconstructed content, when the video encoder system must reduce temporal resolution or spatial resolution in order to reach a target bit rate or lower computational complexity. To favor smooth playback of reconstructed content, the video content is compressed at a higher frame rate but lower spatial resolution. This decision may be suitable for video content with significant motion, but it can result in loss of detail. To favor crisp playback of reconstructed content, screen content is compressed at a lower frame rate but higher spatial resolution. This decision may be suitable for video content depicting text or graphics that are static, but it can result in choppy motion. These prior approaches to favoring smooth playback or crisp playback are inflexible and, in many situations, fail to provide high-quality playback.

In contrast, according to some approaches described herein, a video encoder system adaptively encodes video content based on motion type. In some example implementations, the video encoder system automatically estimates the level of motion in video content and changes encoding parameters dynamically, so that either smooth playback or crisp playback is favored depending on the video content, without manual cues from the user. The encoding parameters can be defined in an encoder layout. For example, when the video encoder system detects low-motion video content (having little or no motion from picture to picture), the video encoder system sets encoding parameters or selects an encoder layout to define a preference for higher spatial resolution of pictures, at a cost of lower frame rate. This provides high-quality playback for video content with text or graphics that are static, still images, etc. On the other hand, when the video encoder system detects high-motion video content, the video encoder system sets encoding parameters or selects an encoder layout to define a preference for higher frame rate, at a cost of lower spatial resolution of pictures. This provides high-quality playback for video content with more motion from picture to picture. In this way, when the video encoder system must reduce temporal resolution or spatial resolution in order to achieve a target bit rate level or lower computational complexity, the video encoder system can adaptively select between reducing temporal resolution or reducing spatial resolution, depending on the video content, thereby improving the overall quality of playback.

A. Examples of Decision-making Processes

This section describes examples of decision-making processes when adaptively encoding video content based on motion type. A video encoder system can use one of the decision-making processes when determining the current motion type for a video sequence.

The rate controller of a video encoder system implements a classifier, which tracks the amount of motion in a video sequence. From picture to picture, the classifier estimates the current level of motion in the video content being compressed. For the estimated current level of motion, the rate controller sets encoding parameters for a video encoder to adjust how the video content is compressed. In some example implementations, the rate controller evaluates motion type at two levels—single-picture level and clip level—considering information over different temporal windows.

For the single-picture-level evaluation, the rate controller calculates two measures of motion between the current picture and previous picture. The previous picture is, e.g., the last stored picture at the rate controller. The rate controller calculates the mean of absolute differences ("MAD") between the pixel values of the current picture being compressed and corresponding pixel values of the previous picture of the video sequence. The MAD value for the current picture is denoted MAD_curr. The corresponding pixel values are the pixel values at the same coordinates as the current picture but in the previous picture. The rate controller also calculates the percentage of different pixel values (DP_curr) between the current picture and the previous picture.

Based on the latest value of the current motion type (e.g., the value of the current motion type used when compressing the previous picture), the rate controller determines threshold values for the two measures of motion. The threshold values depend on implementation. For example, when the latest value of the current motion type is low motion, the MAD threshold (MAD_th) is set to 0.5, and the threshold for percentage of different pixel values (DP_th) is set to 0.3 (that is, 30%). Otherwise (when the latest value of the current motion type is high motion), the MAD threshold (MAD_th) is set to 0.1, and the threshold for percentage of different pixel values (DP_th) is set to 0.05 (that is, 5%).

The rate controller then classifies the current picture as a low-motion picture or high-motion picture. Specifically, if MAD_curr<MAD_th, or if DP_curr<DP_th, the rate controller classifies the current picture as a low-motion picture. Otherwise, the rate controller classifies the current picture as a high-motion picture. Alternatively, the condition that is checked is different. For example, if MAD_curr<MAD_th AND DP_curr<DP_th, the rate controller classifies the current picture as a low-motion picture, but otherwise the rate controller classifies the current picture as a high-motion picture.

By using different threshold values for MAD_th and DP_th depending on the latest value of the current motion type, the rate controller stabilizes the decision-making process. In general, if the measure of motion for the current picture strongly indicates high motion or low motion, then the rate controller classifies the current picture as high motion or low motion, respectively. Otherwise, the motion type is unchanged (that is, the picture classification for the current picture matches the latest value of the current motion type). To illustrate, for the MAD threshold values given above, suppose the MAD value for the current picture (MAD_curr) is 0.3. If the latest value of the current motion type is low motion, the current picture is classified as a low-motion picture (because 0.3<0.5). When the latest value of the current motion type is low motion, the MAD value for the current picture (MAD_curr) must be significantly higher for the picture classification to switch. On the other hand, if the latest value of the current motion type is high motion, the current picture is classified as a high-motion picture (because 0.3>=0.1). When the latest value of the current motion type is high motion, the MAD value for the current picture (MAD_curr) must be significantly lower for the picture classification to switch. The following tables illustrate how having different threshold values that depend on the latest value of the current motion type helps stabilize picture classification.

TABLE 1

Picture Classifications for Example MAD Threshold Values

| MAD_curr | picture classification when latest value of current motion type is LOW (MAD_th is 0.5) | picture classification when latest value of current motion type is HIGH (MAD_th is 0.1) |
| --- | --- | --- |
| 0.0 | LOW (no switch) | LOW (switch) |
| 0.05 | LOW (no switch) | LOW (switch) |
| 0.1 | LOW (no switch) | HIGH (no switch) |
| 0.2 | LOW (no switch) | HIGH (no switch) |
| 0.3 | LOW (no switch) | HIGH (no switch) |
| 0.4 | LOW (no switch) | HIGH (no switch) |
| 0.5 | HIGH (switch) | HIGH (no switch) |
| 0.6 | HIGH (switch) | HIGH (no switch) |

TABLE 2

Picture Classifications for Example DP Threshold Values

| DP_curr | picture classification when latest value of current motion type is LOW (DP_th is 0.3) | picture classification when latest value of current motion type is HIGH (DP_th is 0.05) |
| --- | --- | --- |
| 0.0 | LOW (no switch) | LOW (switch) |
| 0.03 | LOW (no switch) | LOW (switch) |
| 0.06 | LOW (no switch) | HIGH (no switch) |
| 0.1 | LOW (no switch) | HIGH (no switch) |
| 0.2 | LOW (no switch) | HIGH (no switch) |
| 0.3 | HIGH (switch) | HIGH (no switch) |
| 0.4 | HIGH (switch) | HIGH (no switch) |

For the MAD threshold values, the motion type is stable (no change) when 0.1<=MAD_curr<0.5. For the DP threshold values, the motion type is stable (no change) when 0.05<=DP_curr<0.3.

Alternatively, the rate controller can use a threshold value that is independent of the latest value of the current motion type. This alternative approach is more "reactive" in that motion type switches more often.

As another alternative, instead of using values for MAD and percentage of different pixel values, the rate controller can use a different approach to classify the current picture as a low-motion picture or high-motion picture. For example, the rate controller uses a different measure of motion based on differences between pixel values of the current picture and previous picture. Or, the rate controller evaluates MV values used for compression of the previous picture, which can be provided by the video encoder (e.g., evaluating the proportion of the previous picture encoded using motion-compensated prediction with non-zero MV values).

The values for MAD and percentage of different pixel values for the current picture can be computed using differences for all of the pixel values of the current picture. Alternatively (as described below), the values for MAD and percentage of different pixel values for the current picture can be computed using a downsampled version of the differences for the pixel values of the current picture. Using a downsampled version of the differences can help control computational complexity and reduce the volume of data transfer.

In some example implementations, the values for MAD and percentage of different pixel values for the current picture can be computed using differences for luminance pixel values of the current picture and previous picture. Chrominance pixel values are not considered. Alternatively, both luminance and chrominance pixel values are evaluated.

For the clip-level evaluation, the rate controller assesses picture classifications in a temporal window. The duration of the temporal window depends on implementation (e.g., 5 seconds or some other number of seconds). If the temporal window (clip window) is too long, the rate controller can take too long to react. If the clip window is too short, however, the rate controller may switch encoding parameters too often, which can be inefficient for the encoder. The duration of the clip window can be determined by experimentation to balance these factors.

The rate controller counts the number of low-motion pictures (N_low) in the temporal window, where the picture classifications result from the single-picture-level evaluation for the current picture and single-picture-level evaluations for earlier picture in the history (temporal window). The rate controller also counts the overall number of pictures (N_all) in the temporal window.

Based on the latest value of the current motion type (e.g., the value of the current motion type used when compressing the previous picture), the rate controller determines a threshold value for the proportion of low-motion pictures. The threshold value depends on implementation. For example, when the latest value of the current motion type is low motion, the proportion of low-motion pictures threshold (PL_th) is set to 0.2 (that is, 20%). Otherwise (when the latest value of the current motion type is high motion), the proportion of low-motion pictures threshold (PL_th) is set to 0.8 (that is, 80%).

The rate controller then sets the current motion type for the video sequence, for compression of the current picture. Specifically, when the latest value of the current motion type is low motion, if N_low/N_all<0.2, the rate controller sets the current motion type for the video sequence to be high motion, but otherwise keeps the current motion type for the video sequence as low motion. On the other hand, when the latest value of the current motion type is high motion, if N_low/N_all>0.8, the rate controller sets the current motion type for the video sequence to be low motion, but otherwise keeps the current motion type for the video sequence as high motion By using different threshold values for PL_th depending on the latest value of the current motion type, the rate controller stabilizes the decision-making process. In general, if the trend for motion in the pictures in the clip window strongly indicates high motion or low motion, then the rate controller sets the current motion type as high motion or low motion, respectively. Otherwise, the motion type is unchanged (that is, the current motion type used to compress the current picture matches the latest value of the current motion type). To illustrate, for the PL threshold values given above, suppose the proportion of low-motion pictures when compressing the current picture (N_low/N_all) is 0.4. If the latest value of the current motion type is low motion, the current motion type remains low (because 0.4>=0.2). When the latest value of the current motion type is low motion, N_low/N_all must be significantly lower for the current motion type to switch to high. On the other hand, if the latest value of the current motion type is high motion, the current motion type remains high (because 0.4<=0.8). When the latest value of the current motion type is high motion, N_low/N_all must be significantly higher for the current motion type to switch to high. The following tables illustrate how having different threshold values that depend on the latest value of the current motion type helps stabilize the current motion type.

TABLE 3

Current Motion Types for Example PL Threshold Values

| N_low/ N_all | current motion type when latest value of current motion type is LOW (PL_th is 0.2) | current motion type when latest value of current motion type is HIGH (PL_th is 0.8) |
| --- | --- | --- |
| 0.0 | HIGH (switch) | HIGH (no switch) |
| 0.1 | HIGH (switch) | HIGH (no switch) |
| 0.2 | LOW (no switch) | HIGH (no switch) |
| 0.3 | LOW (no switch) | HIGH (no switch) |
| 0.4 | LOW (no switch) | HIGH (no switch) |
| 0.5 | LOW (no switch) | HIGH (no switch) |
| 0.6 | LOW (no switch) | HIGH (no switch) |
| 0.7 | LOW (no switch) | HIGH (no switch) |
| 0.8 | LOW (no switch) | HIGH (no switch) |
| 0.9 | LOW (no switch) | LOW (switch) |
| 1.0 | LOW (no switch) | LOW (switch) |

For the PL threshold values, the current motion type is stable (no change) when 0.2 <= (N_low/N_all) <= 0.8.

Alternatively, the rate controller can use a threshold value that is independent of the latest value of the current motion type. This alternative approach is more "reactive" in that the current motion type switches more often.

As another alternative, instead of using the proportion of low-motion pictures, the rate controller can use a different approach to set the current motion type. For example, the rate controller uses the proportion of high-motion pictures or another measure.

B. Examples of Encoding Parameters

This section describes example encoding parameters used by the rate controller to adjust how a video encoder compresses video content. In general, the encoding parameters depend on the video encoder implementation. For example, the encoding parameters can include frame rate, spatial resolution of pictures, and/or target bit rate for compression. As an encoding parameter, the rate controller can also select between multiple different video encoders. For example, the rate controller can select one video encoder (such as a software-based encoder for a first codec format) to compress low-motion video content but select a different video encoder (such as a hardware-accelerated encoder for the first codec format) to compress high-motion video content. Alternatively, the video encoder system can use other and/or additional types of encoding parameters.

The video encoder system can organize different combinations of encoding parameters in different encoder layouts. For example, each encoder layout includes a different combination of values for frame rate, spatial resolution, and target bit rate.

C. Examples of Operations for GPU Implementations

When a picture of screen content is captured through a GPU (e.g., through an API of the operating system) and encoded using the GPU (e.g., with a hardware-accelerated video encoder), copying the picture to shared memory accessible by a CPU (for purposes of determining the current motion type) is inefficient. To reduce the cost of transferring the picture to shared memory, some of the operations performed to determine the current motion type can be performed with the GPU. This section describes examples of such operations.

Figure 6:
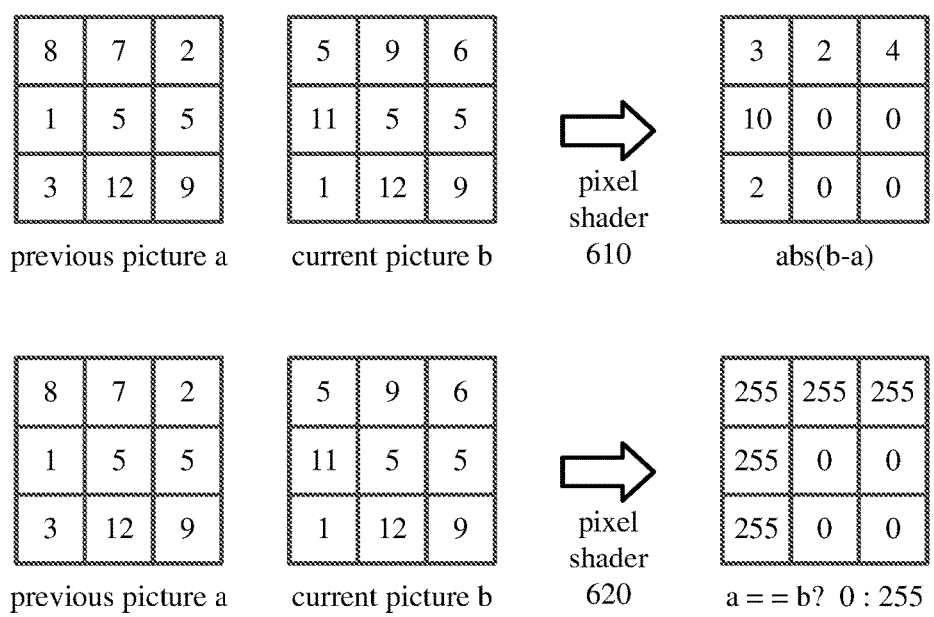
FIGS. 6 and 7 are diagrams illustrating example operations performed with a GPU during adaptive encoding of video content based on motion type.

For example, the GPU receives an input texture for the current picture of screen content. With shader code (e.g., for a vertex shader), the GPU maps the texture to a 2D surface, which stores pixel values for the current picture. Then, with shader code (e.g., for a pixel shader), the GPU calculates differences between pixel values of the current picture and corresponding pixel values of the previous picture (last stored picture). FIG. 6 shows examples (600) of the pixel shader operations. For luminance pixel values of the previous picture (a) and luminance pixel values of the current picture (b), the GPU uses shader code (610) to calculate the absolute differences between the luminance pixel values at corresponding locations: abs(b-a). For the luminance pixel values of the previous picture (a) and the luminance pixel values of the current picture (b), the GPU also uses shader code (620) to calculate which of the luminance pixel values at corresponding locations are different: a==b? 0:255. Matching pixel values are assigned a difference value of 0, and non-matching pixel values are assigned a difference value of 255.

At this point, the MAD value for the current picture can be calculated as the average of the absolute differences between the luminance pixel values at corresponding locations. Similarly, the percentage of changed luminance pixel values can be calculated as the count of difference values equal to 255, divided by the total number of luminance pixel values in the current picture (or as the sum of the difference values divided by (255× the total number of luminance pixel values in the current picture)). These calculations can be performed more efficiently with the CPU. The video encoder system can transfer a first "difference picture" of absolute difference values (from abs(b-a)) and a second "difference picture" of binary difference values (0/255 values, from a==b? 0:255) to shared memory accessible to the CPU. The difference pictures have the same resolution as the original current picture, however, so the transfer can be inefficient.

To reduce the volume of data transferred to shared memory, with the GPU the video encoder system can downsample the difference pictures. In some example implementations, the video encoder system uses approximation with a MIP map chain to downsample difference pictures. In general, a MIP map chain is generated by creating, for a given level of the MIP map chain, a texture that is half width and half height of the texture at the previous level of the MIP map chain. For example, the lowest level of the MIP map chain has dimensions of W×H, the next level has dimensions of W/2×H/2, the next level has dimensions of W/4×H/4, and so on. The downscaling operation can use linear filtering or another type of filter. For linear filtering, a pixel value at a given level is the average of four pixel values at the previous level.

Figure 7:
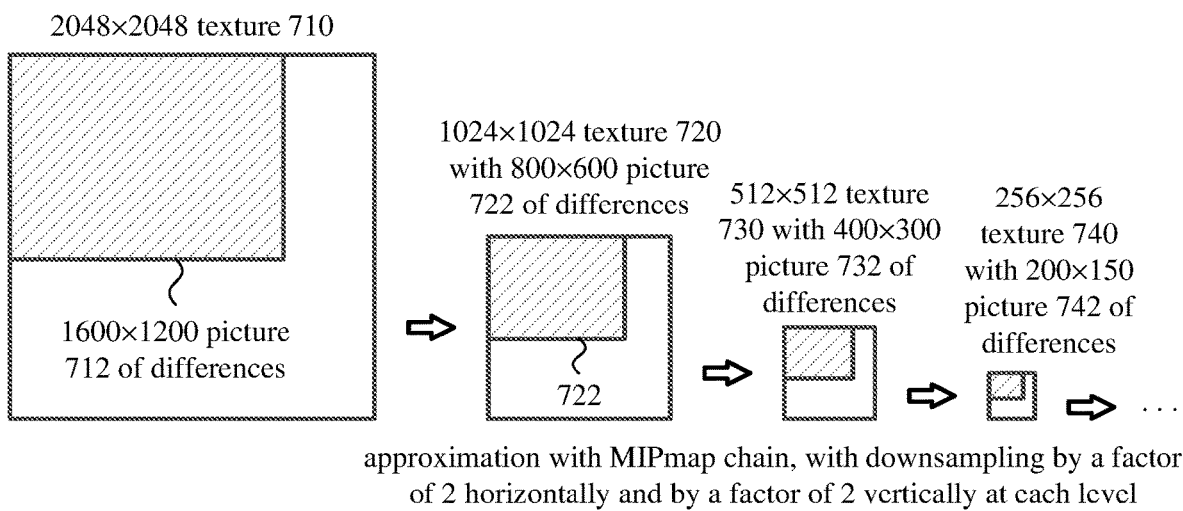

To simplify implementation, each of the dimensions of each level of the MIP map chain is a power of 2 (that is, $2^n$, where n is a whole number). The original difference picture is fit into the smallest level of a MIP map chain that can enclose the original difference picture, and the remaining values of the level of the MIP map chain are assigned values of zero. For example, as shown in the example (700) of FIG. 7, a 1600×1200 picture (712) of differences is enclosed in a 2048×2048 texture (710). The rest of the 2048×2048 texture (710) is filled with zero values. Higher levels of the MIP map chain are then calculated by downsampling by a factor of 2 horizontally and by a factor of 2 vertically at each level. In the example (700) of FIG. 7, the second level is a 1024×1024 texture (720) that encloses an 800×600 picture (722) of differences. The third level is a 512×512 texture (730) that encloses a 400×300 picture (732) of differences. The fourth level is a 256×256 texture (740) that encloses a 200×150 picture (742) of differences. The video encoder system can downsample to even higher levels of the MIP map chain (e.g., 128×128, 64×64).

The level of the MIP map chain transferred to shared memory depends on implementation. In general, transferring a higher level of the MIP map chain (lower spatial resolution) reduces the volume of data transferred, but potentially introduces more error. (Filling empty locations of the lowest level of the MIP map chain with zero values potentially distorts results, if the zero values eventually affect the calculation of MAD values and percentage of different pixel values.) To address these competing concerns, after a difference picture is downsampled to a level of the MIP map chain having a reasonably small resolution (such as 256×256), the level of the MIP map chain (or just the part for the downsampled difference picture) is transferred from GPU memory to shared memory. The MAD value or percentage of changed pixel values is then calculated using the values of the downsampled difference picture. For example, for the example (700) of FIG. 7, the 256×256 texture (740) is transferred to shared memory, and the MAD value (or percentage of changed pixel values) is calculated using the values of the 200×150 picture (742) of differences. In this way, the volume of data transferred to shared memory is reduced, while still permitting efficient calculation of difference values with the GPU. Approximation error (introduced by padding with zero values that effect the edges of the downsampled difference pictures) is negligible.

D. Example Techniques

Figure 8:
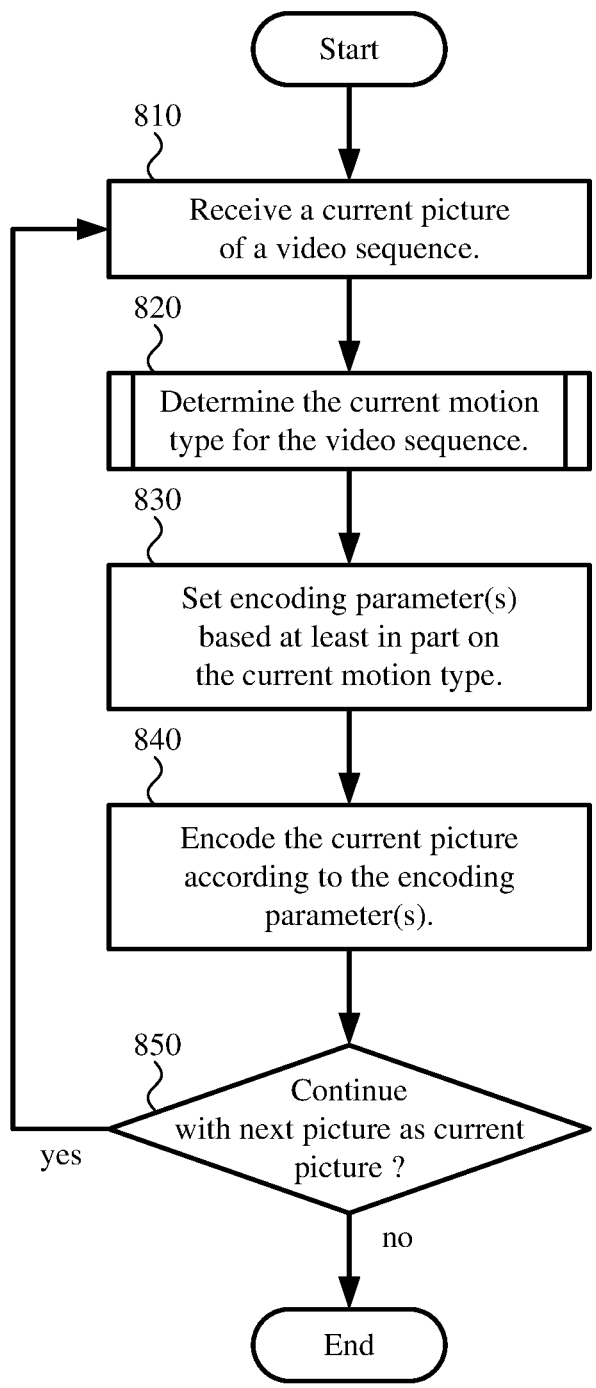
FIG. 8 is a flowchart illustrating a generalized technique for adaptive encoding of video content based on motion type.

FIG. 8 shows a generalized technique (800) for adaptive encoding of video content based on motion type. A video encoder system such as one described with reference to FIGS. 3 and 4, or another video encoder system, can perform the technique (800). The technique (800) can be performed as part of a real-time encoding scenario or other encoding scenario, for screen content or another type of video content.

FIG. 8 shows certain operations performed when encoding a current picture. The video encoder system can repeat the technique (800) to encode other pictures of a sequence.

To start, the video encoder system receives (810) a current picture of a video sequence. For example, a buffer of the video encoder system is configured to receive the current picture. The video sequence includes pictures of screen content. Alternatively, the video sequence includes pictures of another type of video content.

Figure 9A:
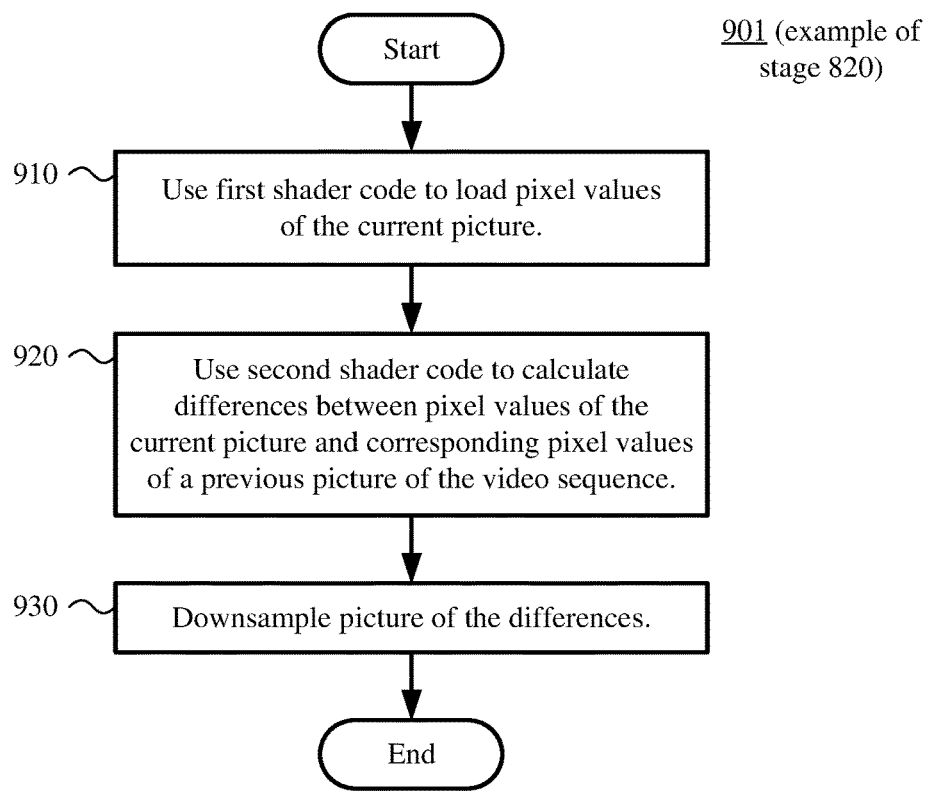
FIGS. 9a-9c are flowcharts illustrating example approaches to determining the current motion type for a video sequence during adaptive encoding of video content based on motion type.
Figure 9B:
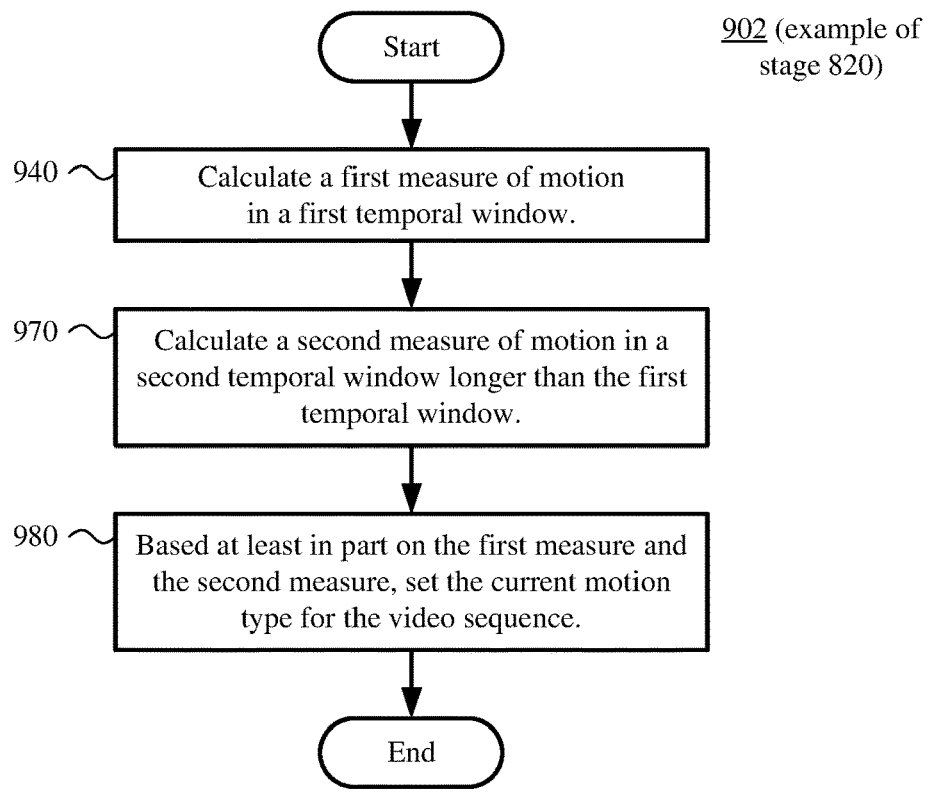
Figure 9C:
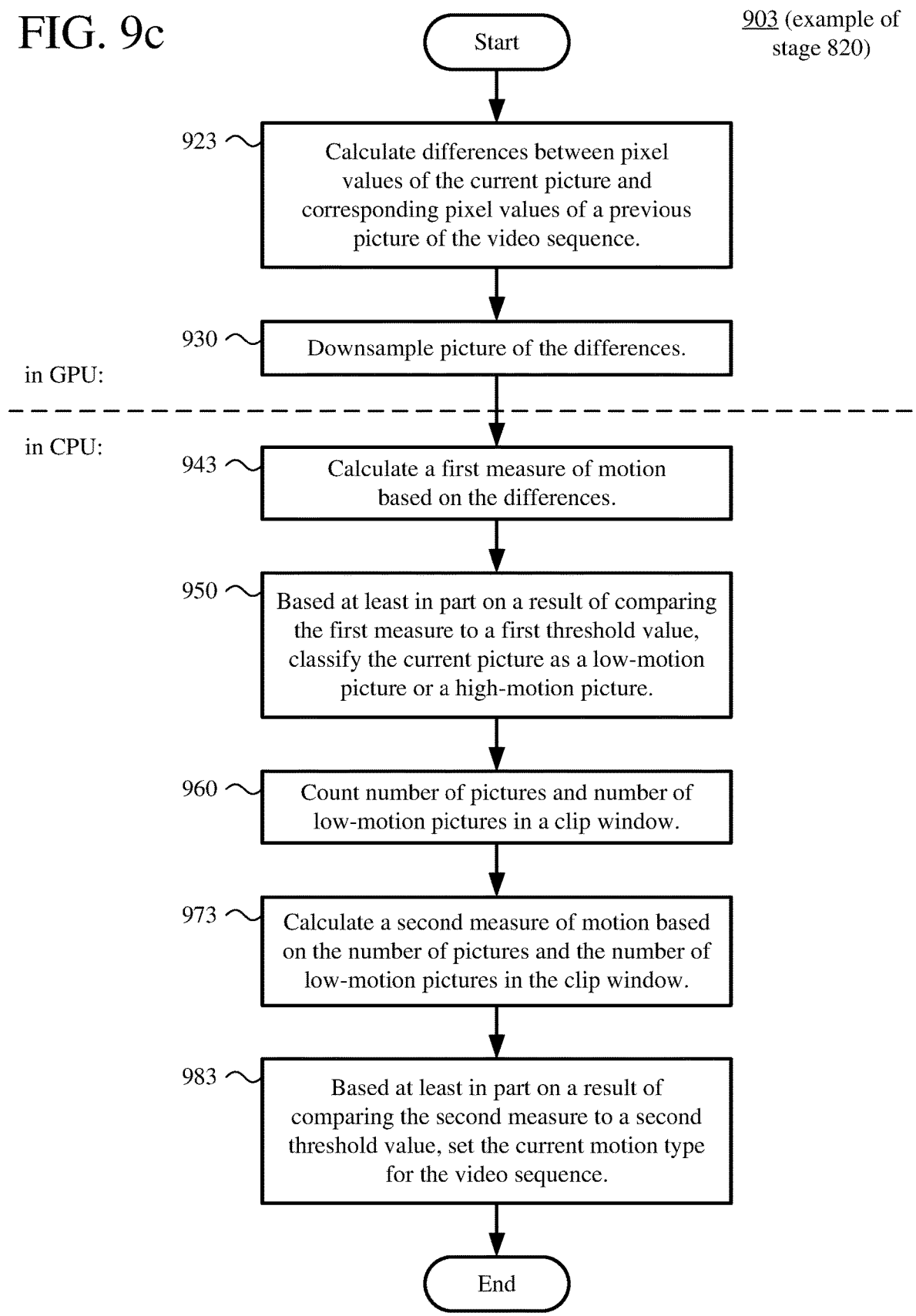

The video encoder system determines (820) a current motion type for the video sequence. For example, a rate controller of the video encoder system is configured to determine the current motion type for the video sequence. FIGS. 9a-9c show example approaches (901, 902, 903) to determining the current motion type for a video sequence during adaptive encoding of video content based on motion type.

The approach (901) shown in FIG. 9a focuses on operations that can be performed with a GPU. In the approach (901), with a GPU, the video encoder system uses (910) first shader code to map texture values for the current picture to pixel values of the current picture. With the GPU, the video encoder system uses (920) second shader code to calculate differences between the pixel values of the current picture and corresponding pixel values (that is, the pixel values at the same locations) of a previous picture of the video sequence. For example, the video encoder system calculates differences between luminance pixel values at corresponding locations of the current picture and the previous picture. The previous picture is, e.g., the last stored picture. For example, the differences are absolute difference values. The differences can also be binary values (such as 0/1, or 0/255) indicating whether pixel values match or do not match. (Using binary values 0/255 facilitates downsampling with integer values.)

With the GPU, the video encoder system can downsample the current picture from a first spatial resolution to a second spatial resolution lower than the first spatial resolution using approximation with a MIP map chain. For example, after using the second shader code to calculate the differences, as part of approximation with a MIP map chain, the video encoder system downsamples a difference picture that includes the differences from the first spatial resolution to the second spatial resolution. Alternatively, before using the second shader code to calculate the differences, as part of approximation with a MIP map chain, the video encoder system downsamples the current picture from the first spatial resolution to the second spatial resolution.

The video encoder system can transfer the differences from memory accessible to the GPU to shared memory. Then, the video encoder system can calculate a measure of motion based on the differences and, based at least in part on a result of comparing the measure to a threshold value, classify the current picture as a low-motion picture or a high-motion picture. For example, the measure of motion indicates a mean of absolute differences between the pixel values of the current picture and the corresponding pixel values of the previous picture. Or, as another example, the measure of motion indicates a proportion of the pixel values of the current picture that are different from the corresponding pixel values of the previous picture.

The approach (902) shown in FIG. 9b focuses on operations that can be performed with a CPU. In the approach (902), the video encoder system calculates (940) a first measure of motion in a first temporal window. In some example implementations, the first measure of motion is based on differences between pixel values of the current picture and corresponding pixel values of a previous picture of the video sequence. In this case, the first temporal window has the duration of a single picture. The differences can be part of a difference picture received from a GPU, or they can be part of a downsampled difference picture received from the GPU. The first measure of motion can indicate a mean of absolute differences between the pixel values of the current picture and the corresponding pixel values of the previous picture. Or, the first measure of motion can indicate a proportion of the pixel values of the current picture that are different from the corresponding pixel values of the previous picture. Or, the video encoder system can calculate both types of the first measure of motion.

The video encoder system can compare the first measure of motion to a threshold value. For example, the threshold value depends on a latest value of the current motion type, which helps stabilize the current motion type across encoding of different pictures of the video sequence. Examples of threshold values for the first measure of motion are described above. Based at least in part on a result of comparing the first measure to a threshold value, the video encoder system classifies the current picture as a low-motion picture or a high-motion picture.

The video encoder system also calculates (970) a second measure of motion in a second temporal window longer than the first temporal window. The second temporal window has a duration of multiple pictures (e.g., 3 seconds of pictures, 5 seconds of pictures, or some other duration). The duration of the second temporal window depends on implementation. In some example implementations, the video encoder system counts a number of pictures in the second temporal window and also counts a number of low-motion pictures in the second temporal window. The second measure is based on the number of pictures in the second temporal window and the number of low-motion pictures in the second temporal window. For example, the second measure indicates a proportion of the pictures in the second temporal window that are low-motion pictures.

The video encoder system can compare the second measure of motion to a threshold value. For example, the threshold value depends on a latest value of the current motion type, which helps stabilize the current motion type across encoding of different pictures of the video sequence. Examples of threshold values for the second measure of motion are described above. Based at least in part on a result of comparing the second measure to a threshold value, the video encoder system sets (980) the current motion type.

The approach (903) shown in FIG. 9c includes operations that can be performed with a GPU and operations that can be performed with a CPU. In the approach (903), with the GPU, the video encoder system calculates (923) differences between pixel values of the current picture and corresponding pixel values of a previous picture of the video sequence. Then, with the GPU, the video encoder system downsamples (930) a picture of the differences, which is transferred to shared memory.

With the CPU, the video encoder system calculates (943) a first measure of motion based on the differences and, based at least in part on a result of comparing the first measure to a first threshold value, classifies (950) the current picture as a low-motion picture or a high-motion picture. The video encoder system counts (960) the number of pictures and the number of low-motion pictures in a clip window and calculates (973) a second measure of motion based on the number of pictures and the number of low-motion pictures in the clip window. Based at least in part on a result of comparing the second measure to a second threshold value, the video encoder system sets (983) the current motion type for the video sequence.

Returning to FIG. 8, the video encoder system sets (830) one or more encoding parameters based at least in part on the current motion type. For example, a rate controller of the video encoder system is configured to set the encoding parameter(s). The encoding parameter(s) can include a frame rate, a spatial resolution, a target bit rate, and/or a selection of one of multiple encoders. Alternatively, the encoding parameter(s) include other and/or additional encoding parameters.

When setting the encoding parameter(s), the video encoder system can select between multiple pre-defined encoder layouts with different combinations of encoding parameters. For example, the video encoder system selectively switches between multiple encoder layouts depending on the current motion type for the video sequence. The multiple encoder layouts include a first layout and a second layout. The first layout has a first frame rate and a first spatial resolution among the encoding parameters. The second layout has a second frame rate and a second spatial resolution among the encoding parameters. The second frame rate is lower than the first frame rate, but the second spatial resolution is higher than the first spatial resolution. Alternatively, the video encoder system switches between encoder layouts defined in other ways.

The video encoder system then encodes (840) the current picture according to the one or more encoding parameters. For example, a video encoder of the video encoder system is configured to encode the current picture according to the encoding parameter(s).

The video encoder system checks (850) whether to continue with the next picture of the video sequence as the current picture. If so, the video encoder system receives (810) the next picture (as the current picture) of the video sequence. Otherwise, the technique (800) ends.

E. Alternatives and Variations

This section describes some alternatives to previously described examples and some variations of previously described examples.

Types of content. In many of the examples described herein, operations are described as being performed by a video encoder when encoding screen content. The screen content can be separate from other types of video content. Approaches to adaptive encoding based on motion type as described herein are particularly well-suited for encoding screen content, which often has long periods of static content, and hence often exhibits a significant difference in bit rate for low-motion content compared to high-motion content. Alternatively, operations described herein can be performed by a video encoder when encoding some other type of video content (e.g., animation or other synthetic video content; natural, camera video content).

Encoding scenarios. Approaches to adaptive encoding based on motion type as described herein are particularly well-suited for real-time encoding scenarios. In real-time encoding scenarios, adaptive encoding improves performance by improving reconstruction quality even when the motion characteristics of video content change within a video sequence. Alternatively, approaches described herein can be used in other encoding scenarios (such as offline encoding, transcoding).

Hardware-accelerated implementations. Approaches to adaptive encoding based on motion type as described herein can be implemented using software executable on a general-purpose CPU. Alternatively, approaches described herein can be implemented using GPU hardware, which can take advantage of opportunities for parallel processing in detection of motion, or special-purpose hardware.

Detecting motion using parameters of encoded data. In some of the examples described herein, motion is detected by calculating differences between pixel values of a current picture and corresponding pixel values of a previous picture. Alternatively, motion is detected using parameters of encoded data such as MV values for the previous picture. For example, the MV values for the previous picture can be evaluated to assess whether a threshold proportion of the previous picture was encoded using non-zero MV values. If so, the current motion type for the video sequence can be set to high motion.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media having stored therein computer-executable instructions for causing one or more processors, when programmed thereby, to perform operations comprising:
    receiving a current picture of a video sequence;
    determining a current motion type for the video sequence, wherein the determining the current motion type includes:
        calculating differences between pixel values of the current picture and corresponding pixel values of a previous picture of the video sequence;
        calculating a first measure of motion in a first temporal window, the first measure being based on the differences;
        based at least in part on a result of comparing the first measure to a threshold value, classifying the current picture as a low-motion picture or a high-motion picture, wherein the threshold value depends on a latest value of the current motion type, so as to stabilize the current motion type across encoding of different pictures of the video sequence; and
        calculating a second measure of motion in a second temporal window longer than the first temporal window;
    setting one or more encoding parameters based at least in part on the current motion type; and
    encoding the current picture according to the one or more encoding parameters.

2. The one or more computer-readable media of claim 1, wherein the pixel values are luminance pixel values, the operations further comprising:
    before the calculating the differences, downsampling the current picture from a first spatial resolution to a second spatial resolution lower than the first spatial resolution; or
    after the calculating the differences, downsampling a difference picture that includes the differences from the first spatial resolution to the second spatial resolution, the first measure being calculated using the downsampled difference picture.

3. The one or more computer-readable media of claim 1, wherein the first measure indicates a mean of absolute differences between the pixel values of the current picture and the corresponding pixel values of the previous picture.

4. The one or more computer-readable media of claim 1, wherein the first measure indicates a proportion of the pixel values of the current picture that are different from the corresponding pixel values of the previous picture.

5. The one or more computer-readable media of claim 1, wherein the determining the current motion type for the video sequence further includes:
    counting a number of pictures in the second temporal window and counting a number of low-motion pictures in the second temporal window, the second measure being based on the number of pictures in the second temporal window and the number of low-motion pictures in the second temporal window; and
    based at least in part on a result of comparing the second measure to a second threshold value, setting the current motion type.

6. The one or more computer-readable media of claim 5, wherein the second measure indicates a proportion of the pictures in the second temporal window that are low-motion pictures.

7. The one or more computer-readable media of claim 5, wherein the second threshold value depends on the latest value of the current motion type, so as to stabilize the current motion type across encoding of different pictures of the video sequence.

8. The one or more computer-readable media of claim 1, wherein the setting the one or more encoding parameters includes selectively switching between multiple encoder layouts depending on the current motion type for the video sequence, the multiple encoder layouts including a first layout and a second layout, the first layout having a first frame rate and a first spatial resolution among the one or more encoding parameters, and the second layout having a second frame rate and a second spatial resolution among the one or more encoding parameters, the second frame rate being lower than the first frame rate, and the second spatial resolution being higher than the first spatial resolution.

9. The one or more computer-readable media of claim 1, wherein the video sequence includes pictures of screen content, and wherein the one or more encoding parameters include a frame rate, a spatial resolution, a target bit rate, and/or a selection of one of multiple encoders, each of the multiple encoders being configured for encoding of screen content.

10. The one or more computer-readable media of claim 1, wherein the one or more processors include a graphics processing unit ("GPU"), and wherein the determining the current motion type for the video sequence further includes, with the GPU:
   using first shader code to map texture values for the current picture to the pixel values of the current picture; and
   as part of the calculating the first measure of motion, using second shader code to calculate the differences between the pixel values of the current picture and the corresponding pixel values of the previous picture of the video sequence.

11. The one or more computer-readable media of claim 10, wherein the determining the current motion type for the video sequence further includes, with the GPU:
   before the using the second shader code to calculate the differences, as part of approximation with a MIP map chain, downsampling the current picture from a first spatial resolution to a second spatial resolution lower than the first spatial resolution; or
   after the using the second shader code to calculate the differences, as part of approximation with a MIP map chain, downsampling a difference picture that includes the differences from the first spatial resolution to the second spatial resolution, the first measure being calculated using the downsampled difference picture.

12. In a computer system that includes one or more processors and memory, a method of video encoding, the method comprising:
   receiving a current picture of a video sequence;
   determining a current motion type for the video sequence, wherein the determining the current motion type includes:
      calculating a first measure of motion in a first temporal window;
      counting a number of pictures in a second temporal window longer than the first temporal window;
      counting a number of low-motion pictures in the second temporal window;
      calculating a second measure of motion in the second temporal window, the second measure being based on the number of pictures in the second temporal window and the number of low-motion pictures in the second temporal window; and
      based at least in part on a result of comparing the second measure to a threshold value, setting the current motion type;
   setting one or more encoding parameters based at least in part on the current motion type; and
   encoding the current picture according to the one or more encoding parameters.

13. The method of claim 12, wherein the determining the current motion type for the video sequence further includes:
   calculating differences between pixel values of the current picture and corresponding pixel values of a previous picture of the video sequence, the first measure being based on the differences; and
   based at least in part on a result of comparing the first measure to a second threshold value, classifying the current picture as a low-motion picture or a high-motion picture.

14. The method of claim 12, wherein the video sequence includes pictures of screen content, and wherein the one or more encoding parameters include a frame rate, a spatial resolution, a target bit rate, and/or a selection of one of multiple encoders, each of the multiple encoders being configured for encoding of screen content.

15. A computer system comprising one or more processors and memory, the computer system implementing a video encoder system comprising:
   a buffer, implemented using the memory of the computer system, configured to receive a current picture of a video sequence;
   a controller, implemented using at least one of the one or more processors of the computer system, configured to perform operations comprising:
      determining a current motion type for the video sequence, wherein the determining the current motion type includes:
         calculating a first measure of motion in a first temporal window;
         counting a number of pictures in a second temporal window longer than the first temporal window;
         counting a number of low-motion pictures in the second temporal window;
         calculating a second measure of motion in the second temporal window, the second measure being based on the number of pictures in the second temporal window and the number of low-motion pictures in the second temporal window; and
         based at least in part on a result of comparing the second measure to a threshold value, setting the current motion type;
      setting one or more encoding parameters based at least in part on the current motion type; and
   an encoder, implemented using at least one of the one or more processors of the computer system, configured to encode the current picture according to the one or more encoding parameters.

16. The computer system of claim 15, wherein the determining the current motion type for the video sequence further includes:
   calculating differences between pixel values of the current picture and corresponding pixel values of a previous picture of the video sequence, the first measure being based on the differences; and
   based at least in part on a result of comparing the first measure to a second threshold value, classifying the current picture as a low-motion picture or a high-motion picture.

* * * * *